(12) United States Patent
Shveidel et al.

(10) Patent No.: US 11,620,062 B1
(45) Date of Patent: Apr. 4, 2023

(54) RESOURCE ALLOCATION TECHNIQUES USING A METADATA LOG

(71) Applicant: Dell Products L.P., Hopkinton, MA (US)

(72) Inventors: Vladimir Shveidel, Pardes-Hana (IL); Ronen Gazit, Tel Aviv (IL); Bar David, Rishon Lezion (IL)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/502,103

(22) Filed: Oct. 15, 2021

(51) Int. Cl.
*G06F 3/06* (2006.01)

(52) U.S. Cl.
CPC .......... *G06F 3/0631* (2013.01); *G06F 3/061* (2013.01); *G06F 3/067* (2013.01)

(58) Field of Classification Search
CPC ......... G06F 3/0631; G06F 3/061; G06F 3/067
USPC ........................................................ 711/154
See application file for complete search history.

(56) References Cited

U.S. PATENT DOCUMENTS

| | | | |
|---|---|---|---|
| 11,068,199 B2 | 7/2021 | Shveidel et al. | |
| 11,080,253 B1 * | 8/2021 | Leshinsky | G06F 16/2272 |
| 11,086,524 B1 * | 8/2021 | Sun | G06F 3/0604 |
| 11,340,829 B1 * | 5/2022 | Shveidel | G06F 12/0871 |
| 11,409,454 B1 * | 8/2022 | Shveidel | G06F 3/0635 |
| 2017/0212690 A1 * | 7/2017 | Babu | G06F 3/0685 |
| 2019/0196982 A1 * | 6/2019 | Rozas | G06F 3/065 |
| 2020/0349074 A1 * | 11/2020 | Kucherov | G06F 3/0619 |
| 2020/0349110 A1 * | 11/2020 | Shveidel | G06F 16/128 |
| 2021/0034235 A1 * | 2/2021 | Kucherov | G06F 13/20 |
| 2021/0124689 A1 * | 4/2021 | Kucherov | G06F 12/0893 |
| 2021/0263664 A1 * | 8/2021 | Glimcher | G06F 3/0644 |

* cited by examiner

Primary Examiner — Than Nguyen
(74) Attorney, Agent, or Firm — Muirhead and Saturnelli, LLC

(57) ABSTRACT

In at least one embodiment, processing can include receiving a metadata (MD) structure including MD pages; and performing a MD split operation with respect to a first of the MD pages, wherein said performing the MD split operation includes: generating a first ALI (abstract logical index) representing a new MD page that is unallocated and is a child of the first MD page; and storing an entry in a bucket of an in-memory MD log for the first ALI, wherein the entry denotes a mapping between the first ALI and a corresponding LI (logical index), wherein the entry indicates that the corresponding LI associated with the first ALI is invalid since the first ALI represents a new MD page which is unallocated and not associated with physical storage; and destaging the in-memory MD log, wherein said destaging includes allocating first physical storage for the new MD page.

18 Claims, 16 Drawing Sheets

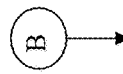

806 — Construct a current version of a MD page C2 using the working set of MD changes for the MD page C2 and a "base" upon which to apply the working set of MD changes. The "base" for the MD page C1 can vary depending on whether the working set of MD changes for the MD page includes any dependency denoted by an IS CHILD OF TUPLE which specifies the MD page C2 being constructed is the child of another parent MD page P2. If there is no such dependency tuple, the existing or current version of the MD page C2 can be read from the BE PDs and used as the "base".

If there is a dependency for the MD page C2 included in the working set of MD pages for the MD page C2, processing can be performed to resolve the dependency occurring in the working set of MD changes. The dependency can be denoted by an IS A CHILD OF tuple which specifies that the MD page C2 is the child of another parent MD page P2. In this case, the parent MD page P2 can be reconstructed and used as the "base" for the MD page C2. Assuming there is no dependency tuple for the parent MD page P2, the parent MD page P2 can be reconstructed by reading the current version of the parent MD page P2 from the BE PDs, and applying any updates made to the parent MD page P2 prior to the occurrence of the IS PARENT OF tuple included in the working set of MD updates for the parent MD page P2 (e.g., where the IS PARENT OF TUPLE indicates that the parent MD page P2 is the parent of the MD page C2).

808 — The working set of metadata changes for the MD page can be applied to, or combined with, the "base" for MD page to thereby result in an updated version of the MD page.

810 — The updated MD page can then be persistently stored on the BE PDs replacing the prior current or existing version of the MD page.

FIG. 10B

RESOURCE ALLOCATION TECHNIQUES USING A METADATA LOG

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving a metadata (MD) structure including a plurality of MD pages; and performing a MD split operation with respect to a first of the plurality of MD pages, wherein said performing the MD split operation with respect to the first MD page includes: generating a first ALI (abstract logical index) representing a new MD page that is unallocated and is a child of the first MD page; and storing a first entry in a first bucket of an in-memory MD log for the first ALI, wherein the first entry denotes a mapping between the first ALI and a corresponding LI (logical index), wherein the first entry indicates that the corresponding LI associated with the first ALI is invalid since the first ALI represents a new MD page which is unallocated and not associated with physical storage; and destaging the in-memory MD log, wherein said destaging includes: allocating first physical storage for the new MD page.

In at least one embodiment, first processing prior to destaging can be performed that includes: performing a first MD update to the new MD page; and storing a second entry in the first bucket of the in-memory MD log, where the second entry denotes the first MD update, and wherein the second entry references the first ALI to represent the new MD page that is unallocated. Destaging can further include: determining that the second entry of the first bucket of the in-memory MD log references the first ALI; searching the first bucket of the in-memory MD log for the first entry denoting the mapping between the first ALI and a corresponding LI, wherein the first ALI maps to the first bucket and wherein the first bucket includes MD updates recorded in the in-memory MD log for the new MD page; performing said allocating the first physical storage for the new MD page, wherein the first physical storage is associated with the new MD page; generating a new LI for the new MD page; and updating the first entry, which denotes the mapping between the first ALI and a corresponding LI, to map the first ALI to the new LI thereby indicating that the first physical storage for the new MD page is allocated.

In at least one embodiment, generating the first ALI representing the new MD page that is unallocated and is a child of the first MD page can be performed by a first of a plurality of nodes in a data storage system, and wherein the in-memory MD log can be local to the first node and used only by the first node. Generating the first ALI can include determining a current value for the first ALI. Determining the current value for the first ALI can further comprise determining a plurality of values for a plurality of fields of the current value of the first ALI, wherein a first of the plurality of fields includes a first of the plurality of values indicating that the current value denotes an ALI associated with an unallocated MD page that is not mapped to physical storage.

In at least one embodiment, a second of the plurality of fields can include a second of the plurality of values indicating a bit value of an identifier of the in-memory MD log of the first node. A third of the plurality of fields can include a third of the plurality of values indicating that the first ALI is generated by the first node.

In at least one embodiment, a fourth of the plurality of fields can include a fourth of the plurality of values that is a sequence number generated by the first node from a sequence of monotonically increasing numbers. The first node can include a pair of in-memory MD logs comprising the in-memory MD log and a second in-memory MD log, wherein the first node can record MD updates in one of the pair of in-memory MD logs currently designated as an active MD log, wherein MD updates may not be recorded in a second of the pair of in-memory MD logs currently designated as an inactive MD log, wherein the in-memory MD log can be designated as the active MD log when performing said MD split operation, and wherein the second in-memory MD log can be designated as the inactive log when performing said MD split operation. Prior to said destaging, second processing can be performed where the second processing can include: designating the in-memory MD log as the inactive MD log so that entries of the in-memory MD log can be destaged in said destaging; and designating the second in-memory MD log as the active MD log where subsequent MD updates are recorded in the second in-memory MD log while the second in-memory MD log is designated as the active MD log. The pair of in-memory MD logs can continually alternate designations as the active MD log and the inactive MD login, and wherein the sequence on the first node can be reset to zero each time there is a switch in designation of the active MD log and the inactive MD log between the pair of in-memory MD logs.

In at least one embodiment, a fourth of the plurality of fields can include a fifth of the plurality of values that is a random number generated by the first node. Processing can include: issuing, by the first node, a request for a first chunk of physical storage for a plurality of MD pages; and locally allocating, by the first node, the first physical storage from the first chunk. The new MD page can be used exclusively in connection with mapping logical addresses to physical storage locations for a first snapshot of a first logical device. The first MD page can be used in connection with mapping logical addresses to physical addresses for the first logical device, and wherein the new MD page can be a child of the first MD page in the MD structure. Prior to performing the MD split operation, the first MD page can be shared for use in connection with mapping logical address to physical storage locations for the first snapshot and the first logical device.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 7C, 7D, 8, 9A, 9B, 10A and 10B are flowcharts of processing steps performed in at least one embodiment in accordance with the techniques of the present disclosure.

DETAILED DESCRIPTION OF EMBODIMENT(S)

Figure 1:
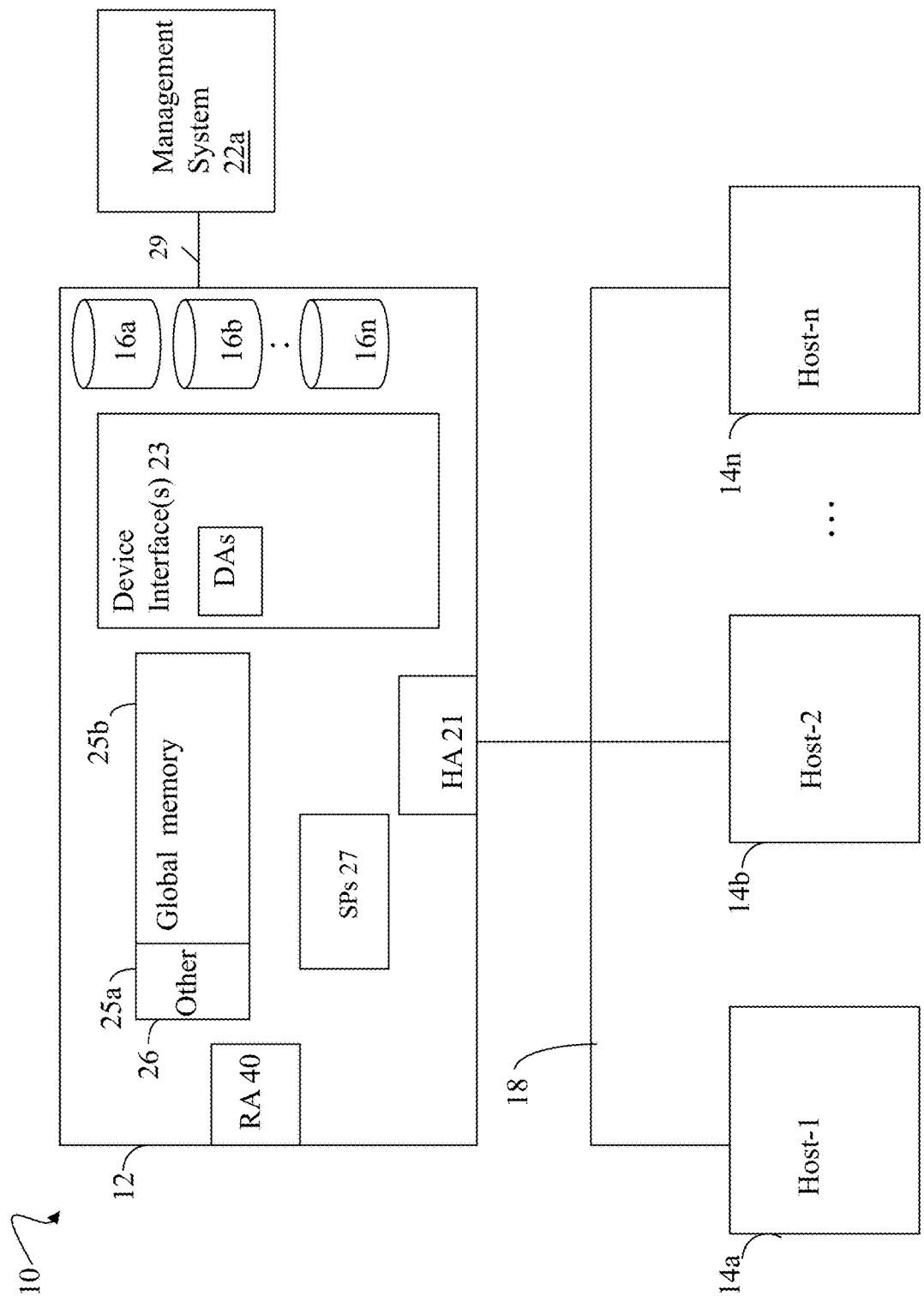
FIG. 1 is an example of components that may be included in a system in accordance with the techniques of the present disclosure.

In at least one existing data storage system, snapshots of logical devices can be used in connection with a variety of different usage scenarios. Generally, a snapshot can be characterized as a point in time logical copy of an entity such as a logical device. Metadata pages can be used to map logical addresses of a logical device and snapshot to corresponding physical storage locations containing content or data stored at the logical addresses. Thus, the metadata pages can also be modified as operations such as writes are performed to the logical device and/or snapshot. A metadata log can be used to record operations such as writes or modifications to the metadata pages associated with the logical device and its snapshot. Subsequently, the logged writes or other operations can be flushed from the metadata log and applied to the corresponding metadata pages such as stored on non-volatile storage. The lifespan of a snapshot, such as measured from snapshot creation time to snapshot deletion time, can be a short amount of time depending on the particular usage of the snapshot. In some case, the lifespan of a snapshot can be less than the amount of time associated with flushing or destaging a particular instance of the metadata log which includes the entries of writes or modifications to the snapshot.

In at least one existing system, an operation recorded in an entry of the metadata log can reference a new metadata page used with the snapshot, where non-volatile physical storage for the new metadata page can be allocated when the operation is recorded in the entry of the metadata log. However, if the snapshot is deleted prior to destaging the entry from the metadata log, the allocation of the new metadata page for the snapshot can be viewed as unnecessary. In this case, the allocated new metadata page is also deallocated and freed for subsequent reuse such as, for example, when destaging entries of the metadata log.

In such an existing system, undesirable overhead can be incurred in connection with unnecessarily allocating the new metadata page for such a deleted snapshot. The undesirable overhead can also include unnecessarily deallocating or freeing the metadata page and also reinitializing the metadata page prior to reuse. Thus generally the process of allocating, freeing and reinitializing a metadata page can be expensive in terms of resources utilized. Such resources can be viewed as unnecessarily expended in connection with the above-noted new metadata page allocated for the short-lived deleted snapshot (e.g., where the snapshot is deleted prior to destaging the entries of the metadata log referencing the new metadata page).

Described in the following paragraphs are techniques which provide for improving on the inefficiencies noted above in connection with the new metadata page allocation such as in connection with snapshots. In at least one embodiment, the techniques of the present disclosure provide for reducing the overhead associated with metadata page allocation such as in connection with metadata page allocation associated with snapshots. In at least one embodiment, an in-memory metadata log can include entries of recorded operations, such as modifications, to metadata pages used in connection with snapshots. Such entries can reference new metadata pages associated with snapshots, where such new metadata pages need to be allocated. In at least one embodiment in accordance with the techniques of the present disclosure, allocation of the new metadata pages associated with a snapshot can be deferred until the entries of the metadata log referencing the new metadata pages metadata log are destaged or flushed from the metadata log. In such an embodiment, if the snapshot is deleted prior to destaging the entries, then the new metadata pages referenced by such entries are not allocated.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), to modify an existing replication schedule or configuration (e.g., which result in updating existing information in one or more database tables for the current replication schedule or configuration), to delete a LUN (e.g., which include deleting the LUN from a table of defined LUNs and also include modifying one or more other database tables to delete any existing snapshots of the LUN being deleted), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information. For example, management commands that read and/or modify the data storage system configuration information in the database can be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

An embodiment of a data storage system in accordance with techniques herein can perform different data processing operations or services on user data stored on the data storage system. For example, in at least one embodiment in accordance with the techniques herein, a data storage system can provide different data replication technologies, facilities or services. Such replication technologies may be characterized as local or remote. Additionally, a replication technology can provide for creating a complete, physical bit for bit copy of data (that is local and/or remote). A replication technology can provide for creating a logical or virtual point in time copy of a data source such as using a snapshot technology or facility known in the art. Such logical copies of a data source are not a complete physical copy of the data source. Rather, different techniques such as a snapshot technique can be used to create a logical or virtual copy of the data source. For example, a snapshot facility may be used in an embodiment in accordance with techniques herein to create a snapshot characterized as a logical point in time copy of data such as of a LUN or other storage object or entity. In connection with a logical device, or more generally any storage object or entity, software of a data storage system can provide one or more data replication services or facilities whereby a snapshot is one such facility that can be used to create point in time snapshot of a logical device such as a LUN for non-disruptive backup. A snapshot can appear like a normal logical device and can be used for backup, testing, and the like. In at least one embodiment, I/O operations such as read and write can be issued to a snapshot such as of a LUN. In at least one embodiment, the snapshot facility may be characterized as a local replication facility or service that takes snapshots of storage objects in a single data storage system. A local replication facility can be contrasted with a remote replication facility that provides for remote replication of storage objects from a source site or data storage system to a remote site or data storage system. Remote replication facilities provide remote copies of the storage objects for use in connection with data unavailability or disaster of the source site.

Snapshots of a source logical device or LUN can rely, for example, on copy on first write (COFW) and other techniques to track source logical device changes from the time when a snapshot was created. Any writes to the source logical device can result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device can be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device can be contrasted, for example, with the physically complete bit-for-bit replicas of the source logical device.

In connection with the foregoing, COFW is only one example of a technology or a technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary or source logical device are redirected (written) to a new location.

Figure 2:
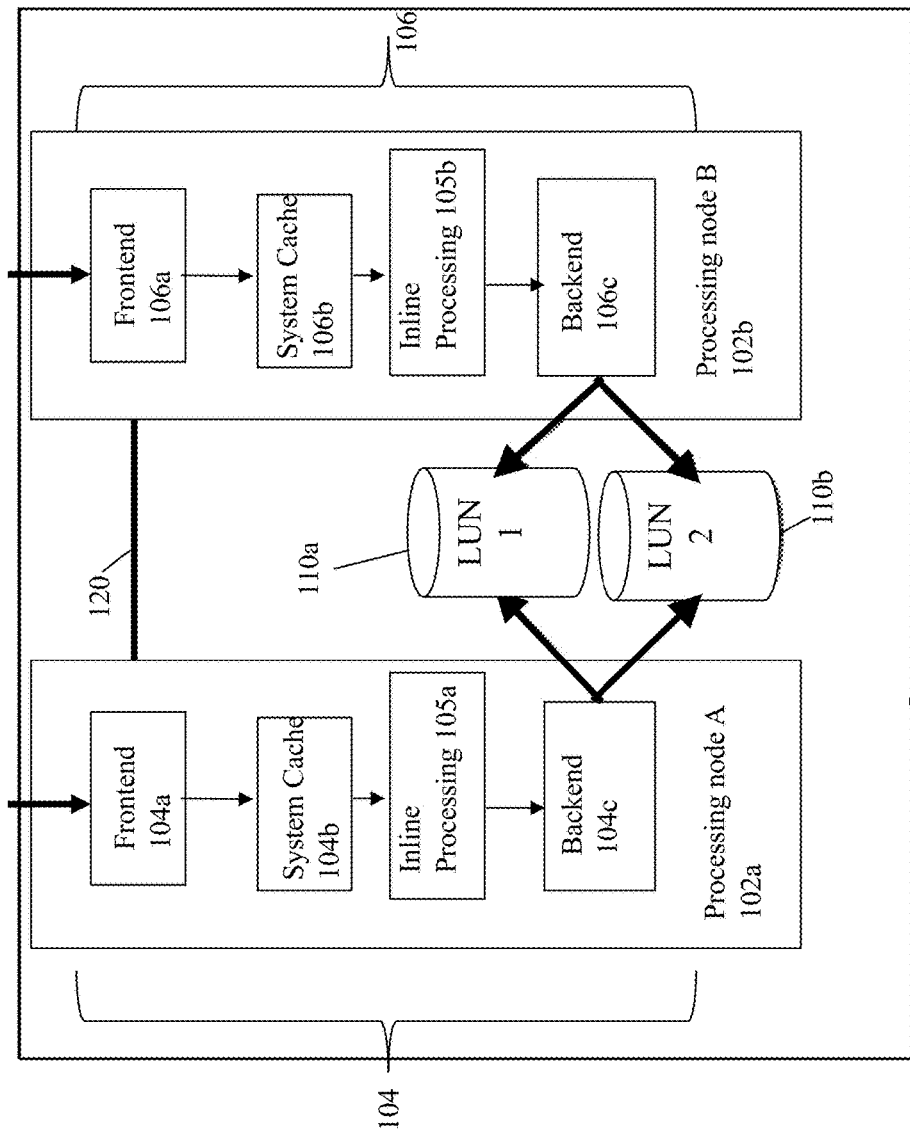
FIG. 2 is an example illustrating the I/O path or data path in connection with processing data in at least one embodiment in accordance with the techniques of the present disclosure.

With reference to the FIG. 2, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2, for write operations, latency can be affected by the amount of time taken to store the write data in the log where the write data is visible to both nodes or controllers of the system.

Consistent with other discussion herein, the log file can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
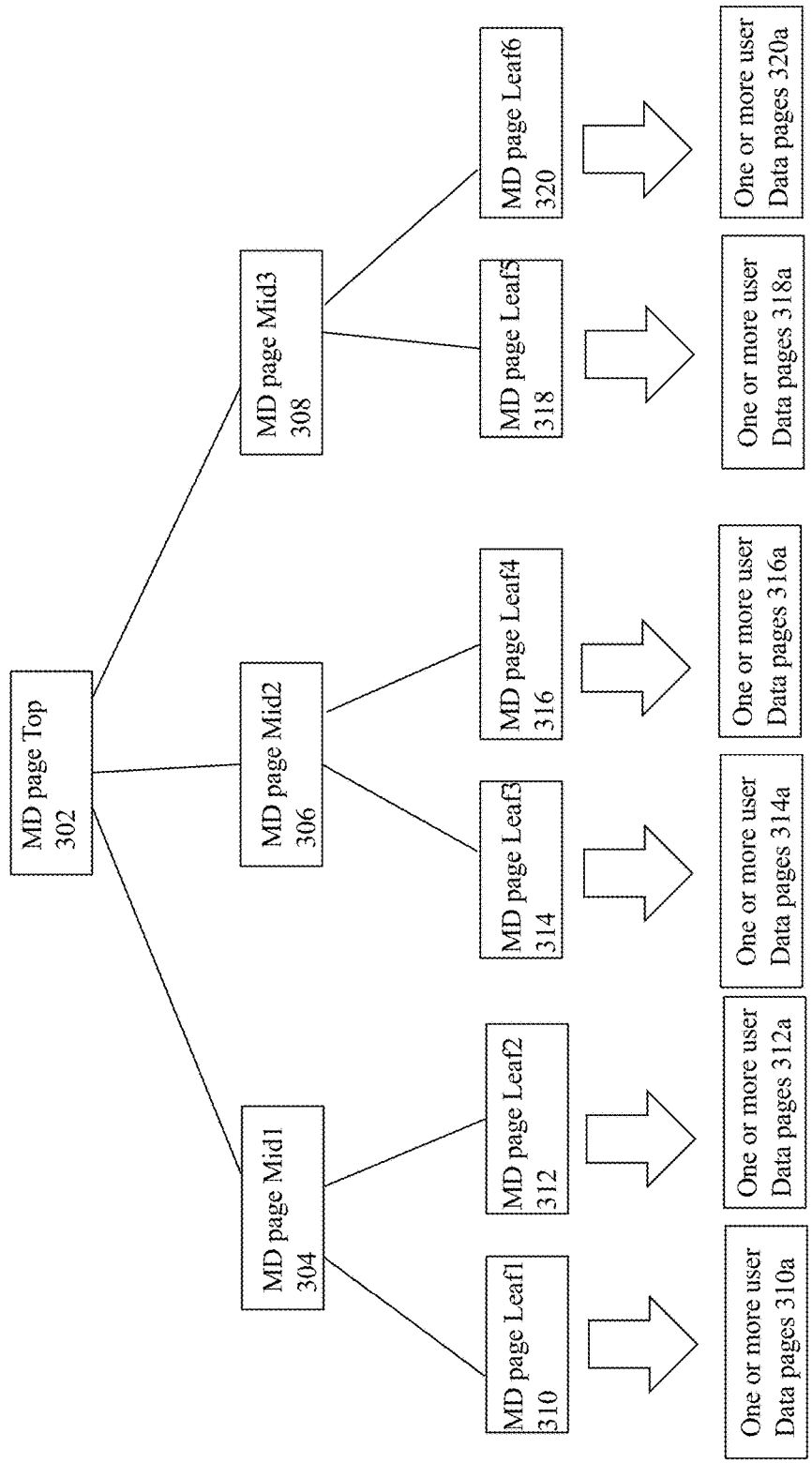
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

In at least one embodiment, the mapping structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
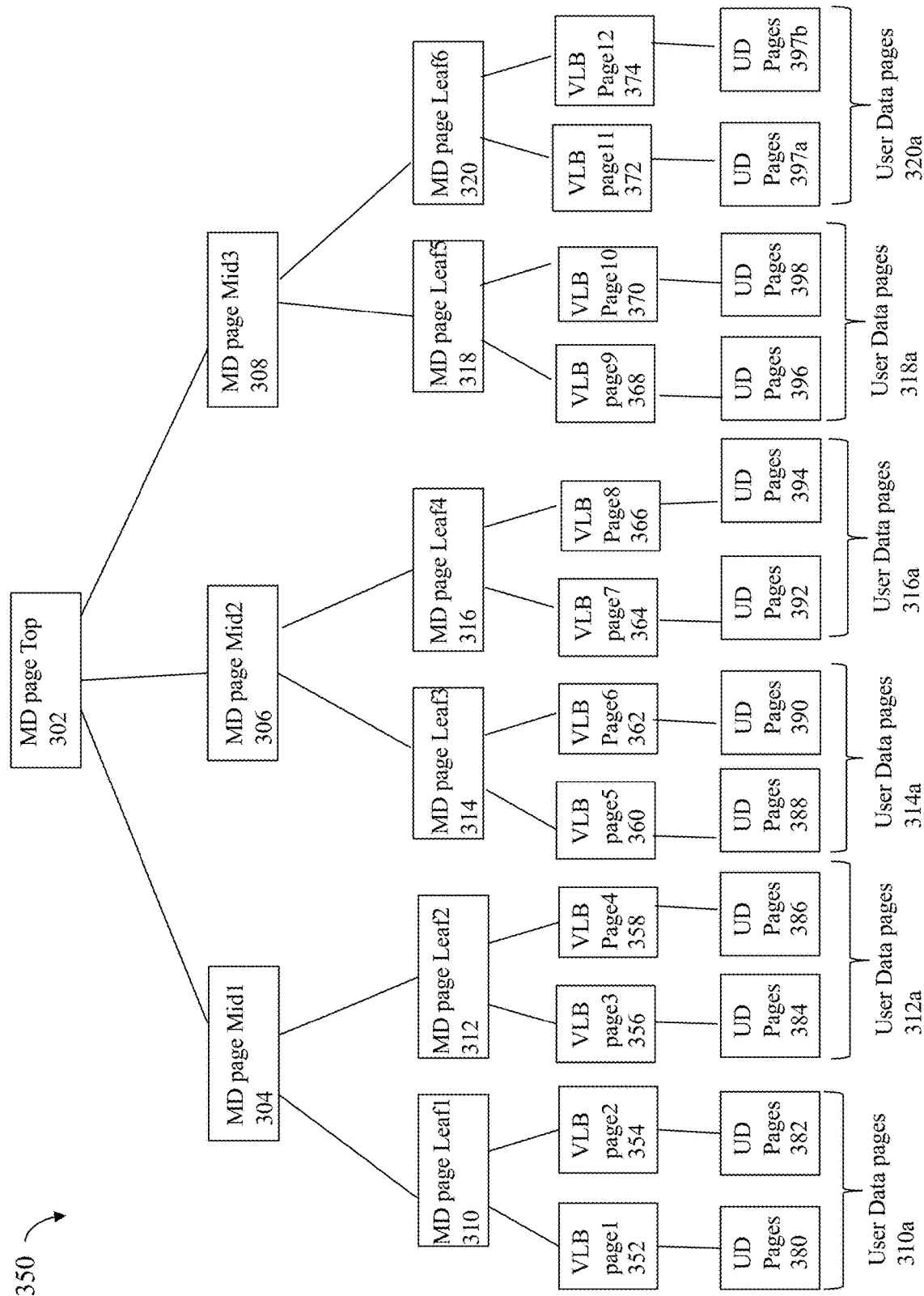

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
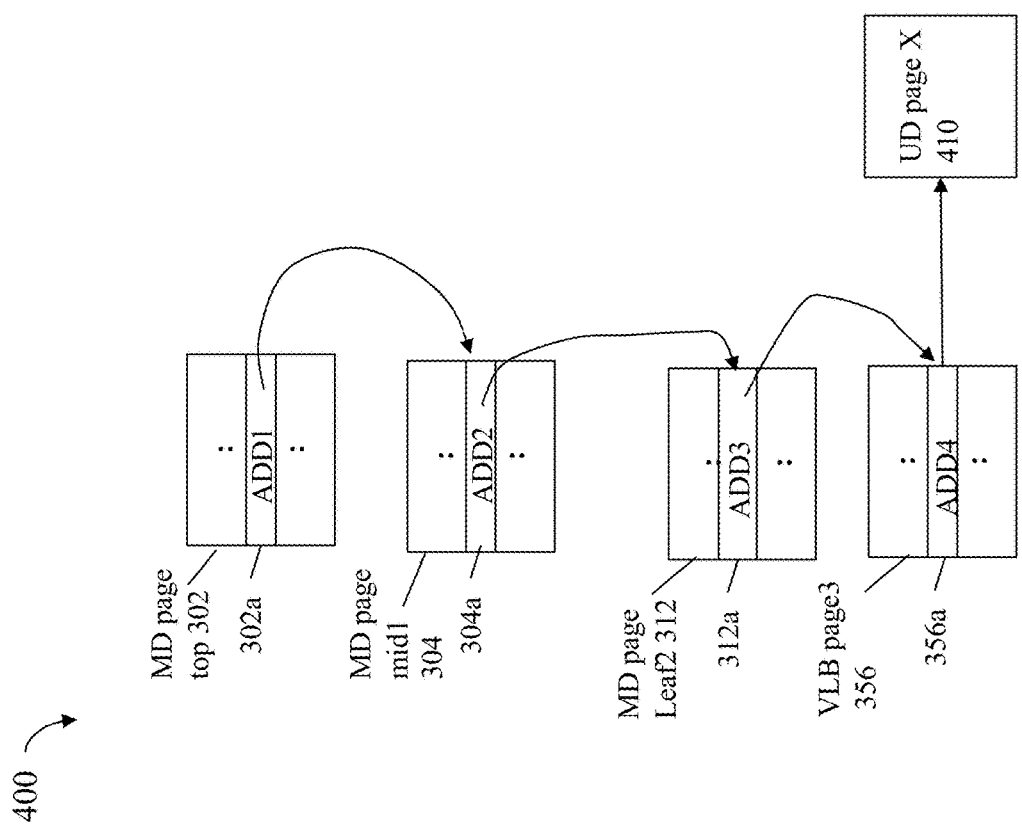

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the location 304a in the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the entry 304a of the particular mid level MD page, such as MD page mid1 304, that is accessed next in the sequence.

Continuing with the example 400, the MD page mid1 304 can be accessed where the location 304a is read to obtain the address or pointer ADD2 from location 304a. The address or pointer ADD2 can then be used to identify the entry 312a of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies location 312a of the MD page leaf 2 312. If the MD page 312 is not already in cache, the on-disk copy of the MD page 312 on a PD can be read to obtain the content of location 312a. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
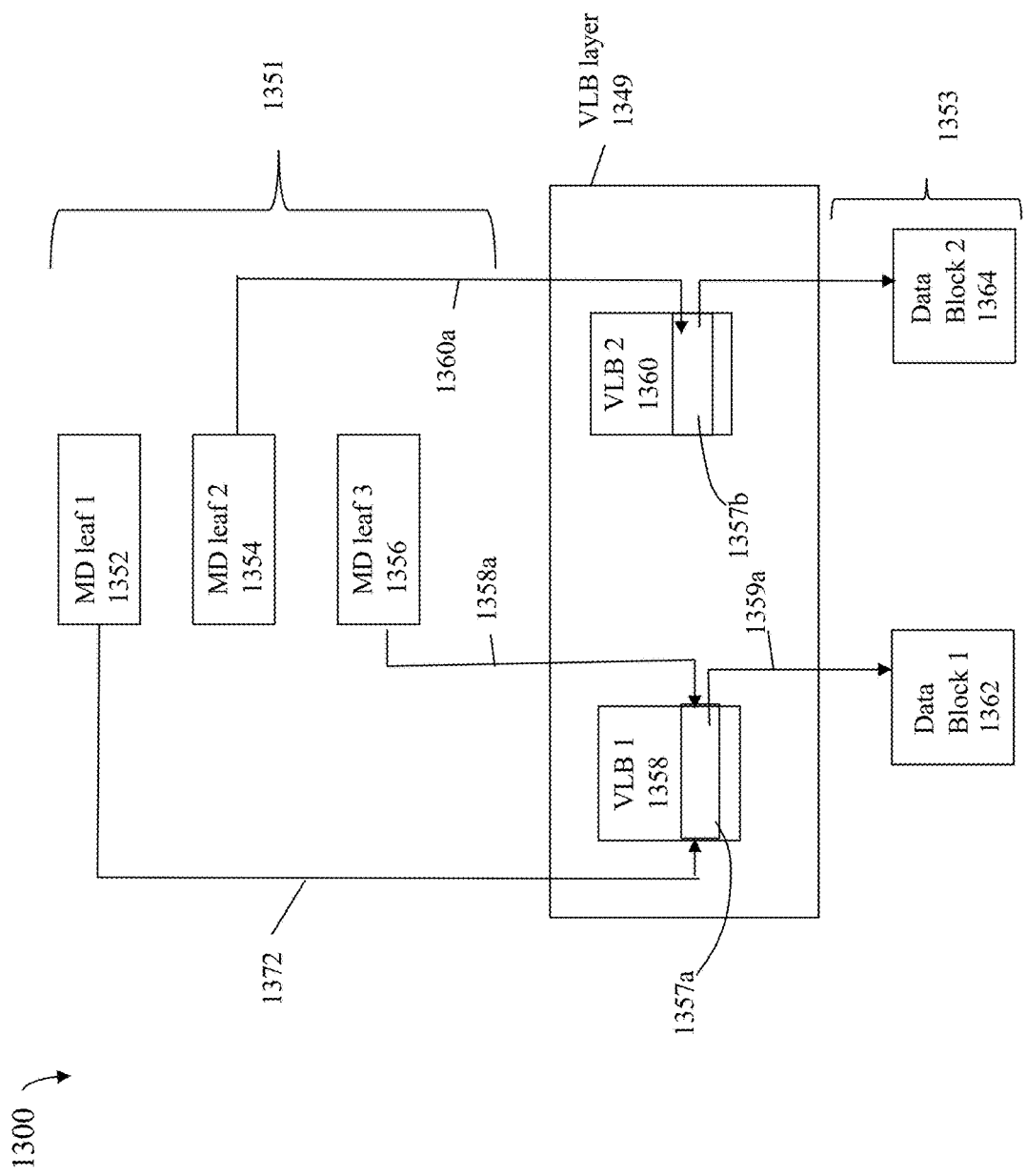

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include a pointer to, or address of, the user data block 1362.

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include a pointer to, or address of, the user data block 1362.

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include a pointer to, or address of, the user data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6. In at least one embodiment, the MD or mapping information used in connection with stored user data can y be stored on non-volatile storage, such as on the BE PDs of the appliance or data storage system. At least some of the MD or mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at physical storage locations on the BE PDs. Additionally, the MD or mapping information corresponding to the logged writes being flushed can also be accordingly updated to reference the physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the MD or mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing, a metadata log architecture can be used which includes a metadata log where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

The foregoing and other aspects of the techniques of the present disclosure are described in more detail in the following paragraphs.

At least one embodiment in accordance with the techniques herein can use various structures, organizations and other techniques as described, for example, in U.S. patent application Ser. No. 16/260,660, SYSTEM AND METHOD FOR AGGREGATING METADATA CHANGES IN A STORAGE SYSTEM, Shveidel et al., now U.S. Patent Publication 2020/0241793A1, published Jul. 30, 2020, (also sometimes referred to herein as the '660 patent application or '660 application) which is incorporated by reference herein in its entirety. Some of the structures and organization as described in the '660 application that can be used in connection with the techniques of the present disclosure are generally described in the following paragraphs with additional modifications made for use with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 3-6).

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer counter can indicate that the size of V is the size of an integer, such as 32 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

Figure 7A:
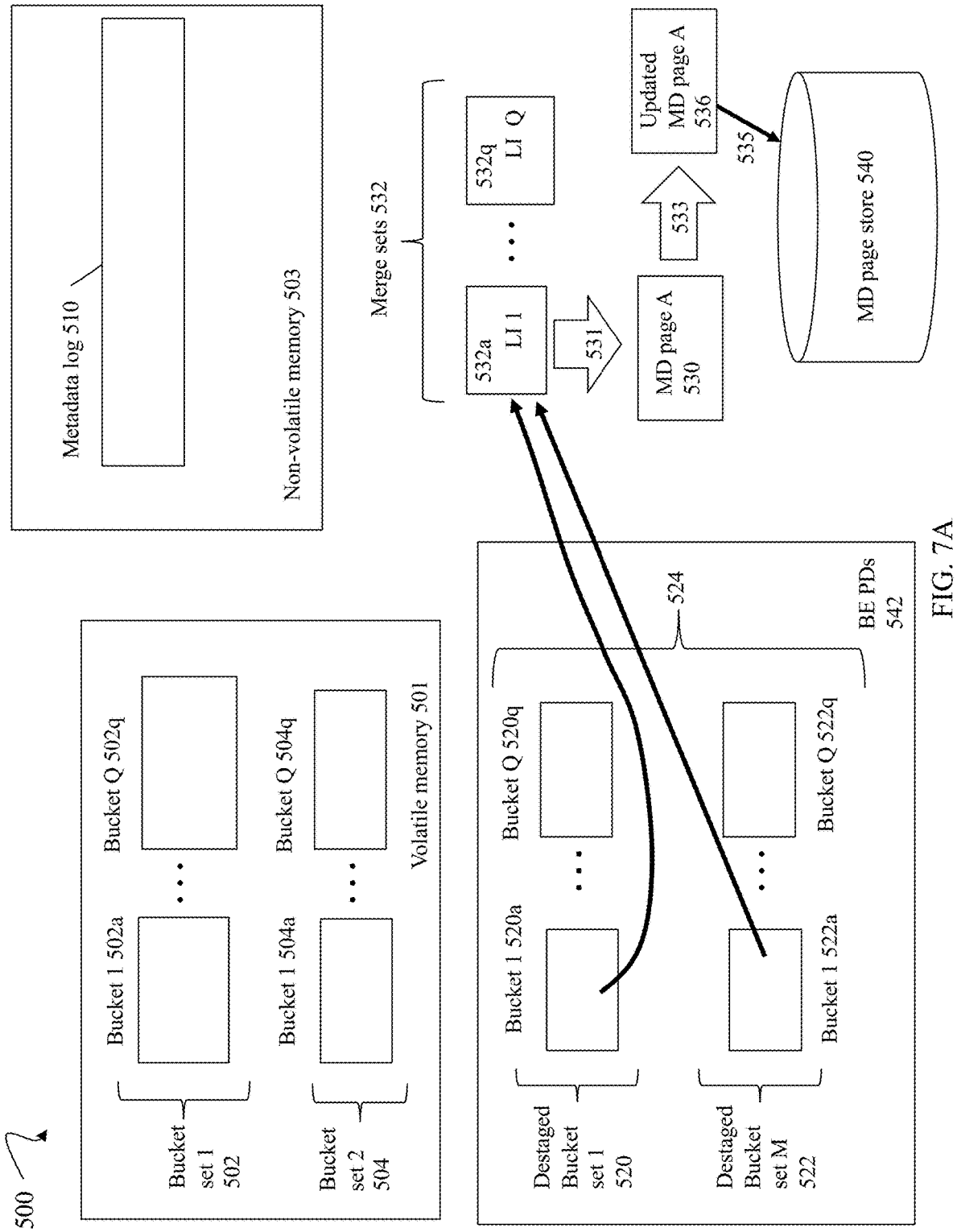
FIG. 7A is an example illustrating structures and associated data flow in at least one embodiment in accordance with the techniques of the present disclosure.

Referring to FIG. 7A, shown is an example 500 illustrating structures and associated data flow in at least one embodiment in accordance with the techniques of the present disclosure.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page.

The volatile memory 501 of each node can include volatile memory structures 502, 504. In at least one embodiment, the structures 502, 504 can denote two bucket sets 502, 504 where at any point in time, one of the two buckets sets 502, 504 can be designated as the active set and the remaining bucket set can be designated as the destaging or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets implemented as an array, where the hash value HV1 of the LI of a MD page denotes the index of the array and the bucket associated with the MD page. Within each bucket associated with a MD page, the metadata updates can be sorted in a time order, from oldest to newest, based on when the metadata updates are received in the system. In at least one embodiment, each bucket (e.g., 502a) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update U1 is made to a MD page, the metadata update U1 can be represented as a tuple. The metadata update U1 can be inserted into the active bucket set as follows. The hash function H is used to calculate a hash value HV of the LI of the MD page (e.g., H(LI)=HV). The HV can denote the bucket uniquely associated with the MD page being updated. For example, assume the bucket set 502 is the active set and assume that the MD page A is being updated with the new metadata update U1. The MD page A can have an LI that generates a hash value=1 mapping to the first bucket, bucket 1 502a, of the bucket set 502. The bucket 502a can be a binary tree including metadata updates to the MD page A. The metadata update U1 can be inserted into the sorted binary tree of 502a based, at least in part, on when the metadata change U1 was received.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two bucket sets 502, 504 of a node at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in a manner as described in the '660 application or any other suitable structures and organization. For example, each destaged bucket set of metadata updates for MD pages can be organized into buckets of bucket pages, where each bucket can correspond or map uniquely to a single MD page. For example, the bucket 1 520a of the destaged bucket set 1 520 can include metadata updates for the MD page A as noted above. The bucket (e.g., 520a) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520a, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520a, 522a) in each of the M destaged bucket sets of 524. The second phase of destaging can aggregate and combine the metadata updates for the MD page A 530 from the first buckets (e.g., 520a, 522a) across the multiple M destaged sets 524 of metadata updates as stored on the BE PDs 542 in the first phase of destaging. The element 532a can denote the merge set of aggregated updates from the first buckets 520a, 522a of the destaged sets 524 for the MD page A 530.

Thus the merge set or working set 532a of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532a of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532a-q based on the LI of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art. A ring buffer can be represented as a logical ring of records or entries. The ring buffer can be maintained using pointers, such as a head pointer and a tail pointer, where new entries of the ring can always be allocated from the head and space reclamation can always be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542.

Figure 7B:
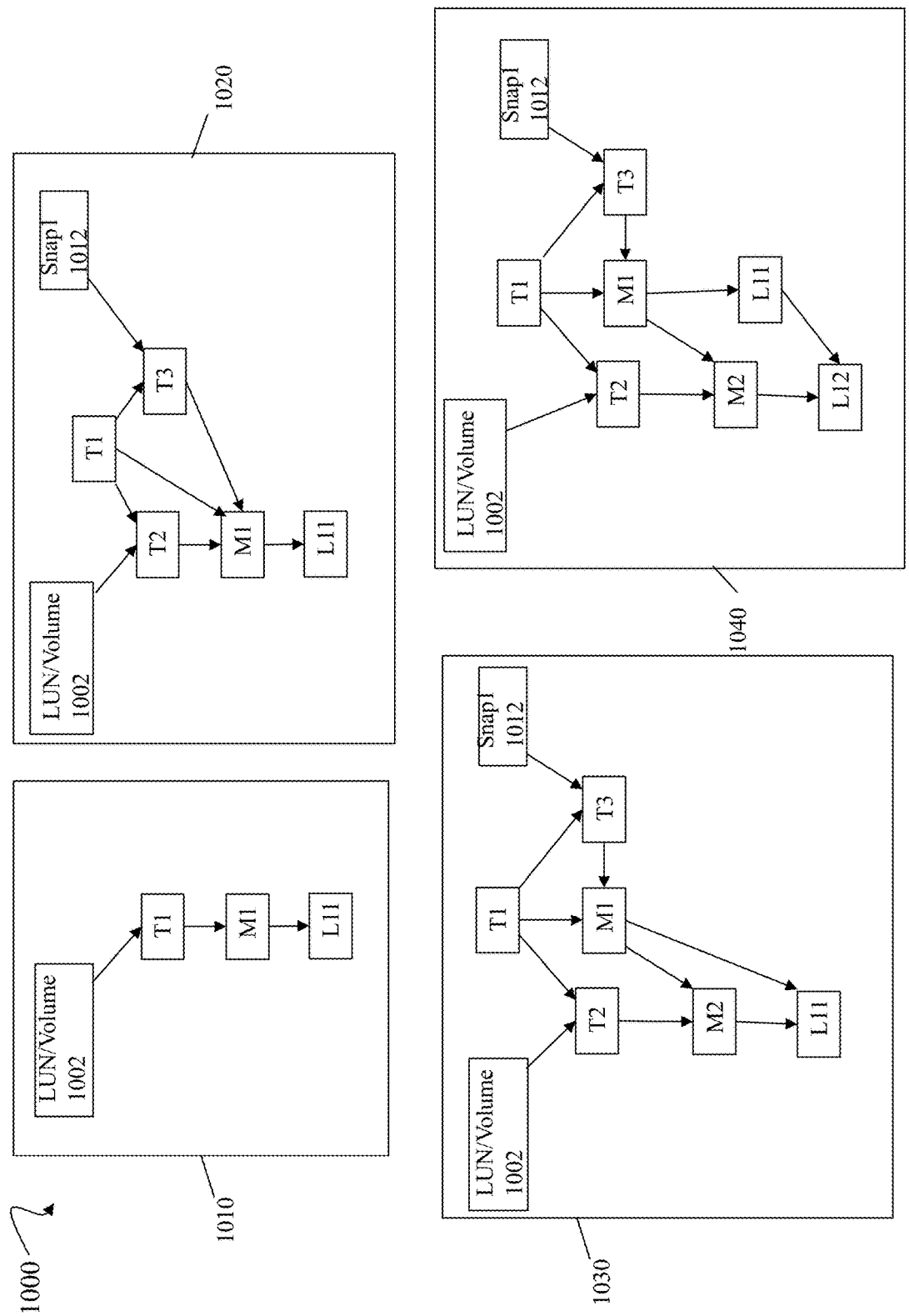
FIG. 7B is an example illustrating metadata pages created and used in connection with different operations in at least one embodiment in accordance with the present disclosure.

What will now be described with reference to FIG. 7B are examples of metadata pages associated with snapshot creation and snapshot related processing in at least one embodiment in accordance with the techniques of the present disclosure. The examples of FIG. 7B assume a MD structure or mapping information as described, for example, in connection with FIGS. 3-6. In the following description, reference is made to elements of FIG. 7A.

Referring to FIG. 7B, shown is an example 1000 illustrating metadata pages used in connection with various operations in at least one embodiment in accordance with the techniques of the present disclosure.

In FIG. 7B, the top level MD pages are denoted as Tn, the mid level MD pages are denoted as Mn, and the leaf MD pages are denoted as Ln. Also pointers from MD leaves Ln to physical storage locations including data are omitted for simplicity of illustration.

The element 1010 illustrates metadata pages T1, M1 and L11 that can be used in connection with creating a LUN or volume at a first point in time. In 1010, the element 1002 denotes a root pointer to the top level MD page T1 for the LUN, where the MD pages T1, M1 and L11 are used in connection with mapping to physical storage locations containing data stored on the LUN.

The element 1020 illustrates metadata pages of the MD structure as a result of issuing a snapshot (snap) creation operation that creates a snap of the LUN or volume at a second point in time subsequent to the first point in time (associated with the element 1010). In 1020, the element 1012 denotes a root pointer to the top level MD page T3 for the snapshot created, snap1. The snapshot snap1 can be created after the writes to the volume have been flushed or destaged from the in-memory metadata log(s) to the metadata page store 540 on the BE PDs. In connection with creating the snapshot snap1 1012, entries made to the in-memory metadata log (e.g., such as an active one of the bucket sets 502, 504) and also the metadata log 510 stored in non-volatile memory can include entries that: update the parent MD page T1 to include pointers to its child MD pages T2 and T3; copy the contents of T1 to T2; and copy the contents of T1 to T3. Thus, creation of the snap 1012 can include allocating new MD pages T2 and T3. The element 1020 can illustrate the MD pages immediately after the snap 1012 of the LUN 1002 is created and prior to any further writes to the LUN 1002 or its snap 1012. In this case, the snap 1012 and the LUN 1002 both contain the same content or data as denoted by the use of the same MD pages M1 and L11. The element 1010 illustrates a MD page split operation of the MD page T1 to result in generation of a the new MD pages T2 and T3. The MD page split operation includes allocating or creating the MD page T2 and T3 from the existing MD page T1.

The element 1030 illustrates metadata pages of the MD structure of as a result of a write operation that writes to a target logical address on the LUN 1002 at a third point in time subsequent to the second point in time (associated with the element 1020). In 1030 in response to the write operation to the LUN 1002, entries made to the in-memory metadata log (e.g., such as an active one of the bucket sets 502, 504) and also the metadata log 510 stored in non-volatile memory can include entries that: update the parent MD page M1 to include a pointer to its new child MD page M2; and copy the contents of M1 to M2. Thus, the write to the LUN 1002 can include allocating the new MD page M2. The element 1030 illustrates a MD page split operation of the MD page M1 to result in generation of a new MD page M2. The MD page split operation includes allocating or creating at least one new MD page from an existing MD page. The existing MD page, such as M1, can be shared between two entities such as the snap 1012 and the LUN 1002 in that the MD page M1 is used by both the entities 1002 and 1012 in connection with mapping logical addresses of the entities such as to retrieve content stored at such logical addresses.

Additionally in response to the write operation to the LUN 1002, the element 1040 illustrates a second change to the MD structure as a result of the write operation to the target address of the LUN 1002. Entries made to the in-memory metadata log (e.g., such as an active one of the bucket sets 502, 504) and also the metadata log 510 stored in non-volatile memory can include entries that: update the parent MD page L11 to include a pointer to its new child MD page L12; copy the contents of L11 to L12; update an entry E1 of L12 to point to the newly written data of the write operation; and update an entry E1 of M2 to point to the new child MD page L12. Thus, the write to the LUN 1002 can include allocating the new MD page L12. The element 1040 illustrates a MD page split operation of the MD page L11 to result in generation of a new MD page L12. The MD page split operation includes allocating or creating at least one new MD page from an existing MD page. The existing MD page, such as L11, can be shared between two entities such as the snap 1012 and the LUN 1002 in that the MD page L11 is used by both the entities 1002 and 1012 in connection with mapping logical addresses of the entities such as to retrieve content stored at such logical addresses.

Thus as illustrated by the elements 1030 and 1040, the write to the LUN 1002 or its snap 1012 which uses a shared existing MD page can result in splitting the existing MD page which includes allocating a new MD page and copying the contents of the existing MD page to the new MD page.

In at least one embodiment, copying of metadata from one MD page to another MD page such as in connection with the above-noted elements 1020 (e.g. copy T1 to T2 and T3), 1030 (e.g., copy M1 to M2) and 1040 (e.g., copy L1 to L2) can be deferred or postponed until destaging by creating, at the time of the MD page split operation, a pair of entries in the in-memory metadata log (e.g., such as an active one of the bucket sets 502, 504) and also the metadata log 510 stored in non-volatile memory. The pair of entries can each be represented by a tuple using a new tuple type T. The pair of entries can generally denote a linking or mapping between a parent MD page and a child MD page, and can also denote copying semantics of a copy operation performed at destaging time. The copy operation can be implied by the mapping and can include copying the content of the parent MD page to its child MD page. For purposes of illustration, assume the pair of entries is representing the parent and child relationship between L11 and L12 as discussed in connection with the element 1040 of FIG. 7B. In at least one embodiment, the pair of entries can include: a first entry indicating that L12 IS A CHILD OF L11, and a second entry indicating that L11 IS A PARENT OF L12. In such an embodiment, new tuple types can be added to denote the relationships of IS A CHILD OF and IS A PARENT OF. For example, the first entry can be represented using a tuple where the LI=L12 (e.g., denoting the child MD page), T is a type denoting the IS A CHILD OF relationship, and V can be L11 (denoting the parent MD page L11 of the child MD page L12. The first entry can be represented using a tuple where the LI=L11 (e.g., denoting the parent MD page), T is a type denoting the IS A PARENT OF relationship, and V can be L12 (denoting the child leaf MD page L12 of the parent MD page L11). The metadata logs of both the in-memory active bucket set and the non-volatile MD log 510. The foregoing two entries can denote the semantics of the copying of data from a parent MD page to its child MD page where such copying can be performed at destage time when the two entries are destaged from the in-memory metadata log or active bucket set. In particular, the child MD page can be constructed at destage time and only in the case where the particular entity, such as the LUN or snapshot, associated with the child MD page is not otherwise deleted before destaging the active bucket set which includes the foregoing pair of entries or tuples describing the parent-child MD page relationship.

The foregoing two entries denoting the copying semantics and the parent-child relationship between the two MD pages L11 and L12 can also denote a time relationship between the particular L11 and L12 buckets of the in-memory metadata log or active bucket set. In particular, when reconstructing the MD child page L12 at destage time, the parent MD page L11 can be reconstructed and used as a base for the MD child page L12. The parent MD page L11 can be reconstructed where any changes or deltas made to the parent MD page L11 occurring in the bucket L11 prior to the above-noted second entry indicating that L11 IS A PARENT OF L12 can be applied. In at least one embodiment, the foregoing can be recursively applied, for example, in the case that the parent MD page L12 itself is a child of a third MD page where there is a pair of entries denoting the copy semantics and parent-child MD page relationship between the third MD page as a parent and the MD page L12 as its child.

Although not explicitly illustrated in connection with FIG. 7B, in at least one embodiment, writes can also be issued to the snapshot 1012. If, for example, the write operation in connection with elements 1030 and 1040 is issued to the snap 1012 rather than the LUN 1002, the MD pages M2 and L12 can be associated with the snap 1012 rather than the LUN 1002, and the MD pages M1 and L11 can be associated with the LUN 1002 rather than the snap 1012. In this case, the parent MD pages M1 and L11 can be owned or used exclusively in connection with mapping logical addresses for the LUN 1002; and the child MD pages M2 and L12 can be owned and used exclusively in connection with mapping logical addresses for the snap1 1012. In this case in at least one embodiment, the MD page M1 can be the parent of the MD page M2 and the MD page L11 can be the parent of the MD page L12.s In accordance with the techniques of the present disclosure, the foregoing can be further optimized in that the allocation of a new MD page, such as allocation of a child MD page, can be deferred until destaging. At destaging time, the new MD page can then be allocated only if the particular entity using the new MD page has not been deleted.

Consider one usage scenario as discussed above in connection with short-lived snapshots where a new MD page is used only by the snapshot and not shared with another snapshot or LUN. In at least one embodiment, the techniques of the present disclosure provide for deferring allocation of the new MD page, such as a child MD page used for the snapshot, until destage time. The new MD page can then be allocated at destage time when destaging the in-memory metadata log or active bucket set only if the snapshot exclusively using the new MD page has not been deleted.

For example with reference to the element 1020 of FIG. 7B, assume that the snapshot snap1 1012 is deleted prior to destaging an active bucket list describing MD page updates and MD split of the MD page T1 which results in creating two new MD pages T2 and T3 and where the content of the MD page T1 is copied to T2 and T3. In accordance with the techniques herein, the allocation of the MD pages T2 and T3, as well as copying the content from T1 to T2 and T3 can be deferred until destaging of the active bucket list. In this case, the snap 1 1012 is deleted prior to the destaging whereby the foregoing allocation of T2 and T3 and the copying of T1 to t2 and T3 can be omitted.

Generally, overhead can be incurred in connection with the allocation, freeing and general management of a MD page. In at least one embodiment, allocation of the MD page is deferred until destaging and then is allocated only of the snapshot associated with the unallocated MD page has not been deleted prior to the destaging. If an entity such as a snapshot associated with the MD page is deleted prior to destaging the in-memory metadata log (e.g., active one of the bucket sets 502, 504) referencing the MD page, then the MD page is not allocated. In this manner, the allocation and other management operations associated with the management of the MD page can be omitted since the MD page is thus never allocated if the associated snapshot is deleted prior to destaging. In other words in at least one embodiment, the MD page is allocated when destaging the in-memory metadata log entry referencing the MD page only if the particular entity, such as the snapshot, associated with the MD page has not been deleted prior to the destaging of the referencing metadata log entry.

The techniques of the present disclosure can be illustrated in the following paragraphs with reference to a new MD page to be allocated in connection with a snapshot of a source LUN or volume. The new MD page can be a child MD page of an existing parent MD page used, for example, by the source LUN or volume. More generally, the techniques of the present disclosure can be used in connection with other usage scenarios and contexts besides the particular examples provided herein for purposes of illustration. More generally, the techniques of the present disclosure can be used, for example, in connection with any suitable context and usage scenario with respect to a parent MD page and its child MD page where the allocation of the child MD page is deferred until destaging of the MD log, such as the in-memory MD log including one or more records describing the parent-child relationship between the parent MD page and the child MD page.

In at least one embodiment of the techniques of the present disclosure, the LI used to uniquely identify a MD page with respect to all other MD pages can be based on a physical storage location of the physical storage allocated for the MD page. For example, the physical storage location can be a BE PD location of persistent physical storage allocated for the MD page. The BE PD location can be, for example, included in physical storage used for the persistent MD page store which persistently stores MD pages. For example, the LI can be based on an offset, location or index associated with the allocated non-volatile physical storage of the MD page. In at least one embodiment, the physical storage for the MD page can be included in a persistent MD page store.

In at least one embodiment not in accordance with the techniques of the present disclosure the physical storage of each new MD page, including the above-noted child MD page, can be allocated when recording operations in the MD log (e.g., both in-memory and on non-volatile storage) which either write to the new MD page or otherwise reference the new MD page. In such an embodiment, the recorded operations can be in the form of a tuple discussed elsewhere herein, where the tuple uses the unique LI of the MD page.

In at least one embodiment in accordance with the techniques of the present disclosure utilizing the non-volatile MD log, the in-memory metadata log and tuples discussed herein, an alternative to an LI can be used for such new MD child pages whose allocation is deferred until the destaging of the in-memory metadata log including entries or tuples that reference the new MD child page. In at least one embodiment, an abstract LI or ALI can be used rather than an LI in connection with recording entries in the form of tuples in the MD logs since physical storage for such new MD pages are not allocated at the time the tuples are written to the MD logs. The ALI can be generated prior to destaging the in-memory metadata log while creating new entries or tuples in the in-memory metadata log (e.g., active one of the bucket sets 502, 504). The ALI can be used as needed in entries or tuples of the in-memory metadata log where such entries or tuples which typically reference an LI can now alternatively reference the ALI. At destage time of the in-memory metadata log, any reference to an ALI can be resolved and replaced with another generated LI which is associated with an allocated physical MD page. The ALI and use thereof are described in more detail in the following paragraphs.

The ALI is a unique index or key that can represent a MD page logically without having an association or mapping to a physical storage location or physically allocated MD page. Put another way, generating or allocating an ALI does not involve allocating physical storage for a MD page but rather involves generating or allocating the ALI without any associated physical storage allocation for the MD page logically represented by the ALI. In at least one embodiment, the ALI can be viewed in one aspect as a temporary unique index, key or value which represents the unallocated associated MD page. In at least one embodiment, the ALI can then be used in tuples of the in-memory MD log rather than an LI. In at least one embodiment the ALI can logically represent a MD page which can be characterized as unallocated or not yet associated with physical storage when recording one or more entries or tuples in the in-memory MD log, where such entries or tuples can reference the unallocated MD page using its associated ALI. Subsequently, physical storage for the MD page can be allocated when the tuples referencing the MD page are destaged from the in-memory MD log.

In at least one embodiment, all ALIs can be distinct and distinguishable from all LIs or regular LIs. In at least one embodiment, ALIs can be distinguished from LIs by a particular bit setting. For example in at least one embodiment as discussed in more detail below, all ALIs can have the most significant bit or MSB=1 and all LIs can have the MSB=0. In at least one embodiment, each ALI can be 64 bits in size although more generally each ALI can be any suitable size.

Figure 7C:
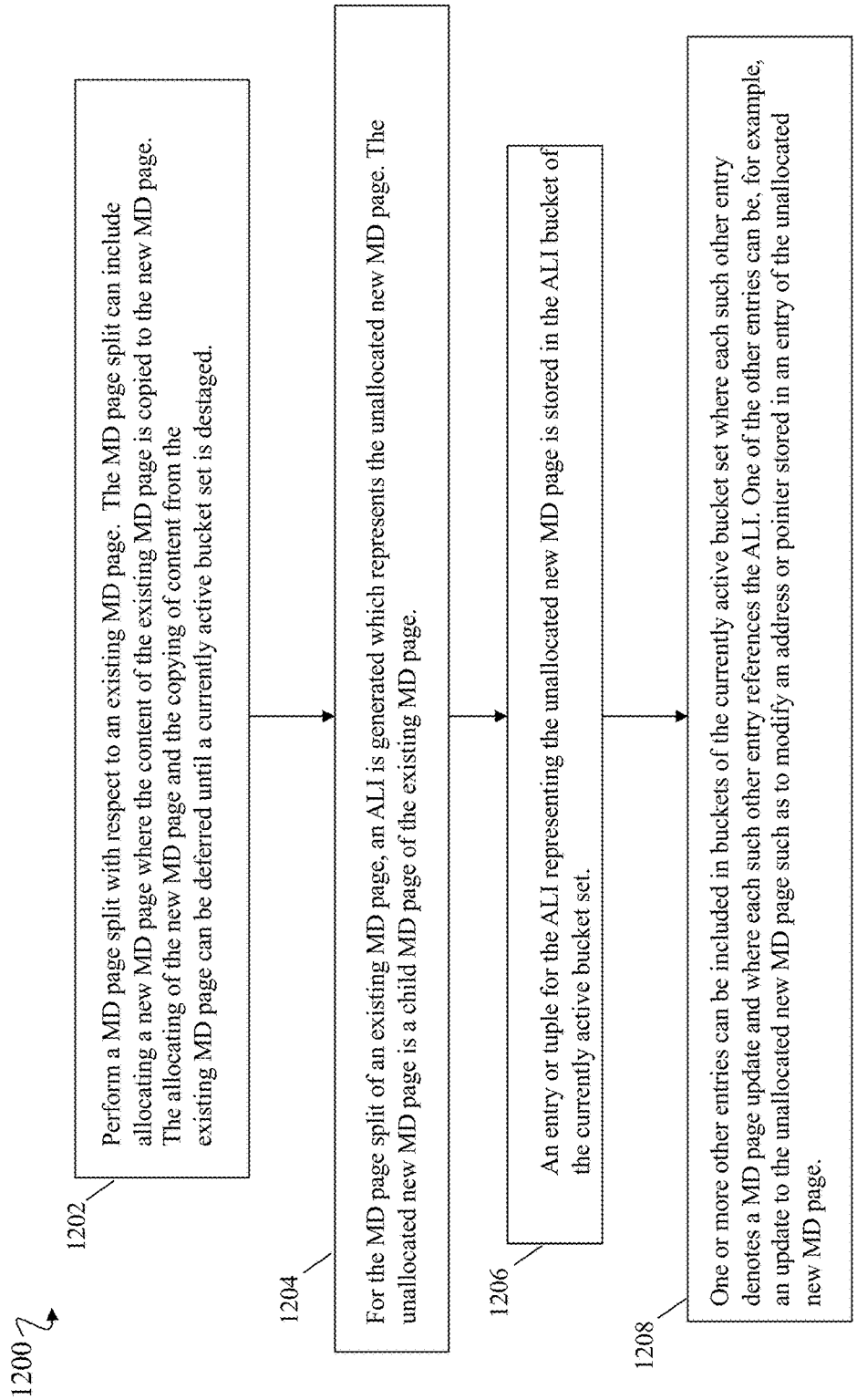

In at least one embodiment with reference to the flowchart 1200 of FIG. 7C, a MD page split can be performed with respect to an existing MD page in a step 1202. The MD page split can include allocating a new MD page where the content of the existing MD page is copied to the new MD page. The allocating of the new MD page and associated LI, and the copying of content from the existing MD page can be deferred until a currently active bucket set is destaged. Thus in at least one embodiment in accordance with the techniques of the present disclosure, in response to a MD page split that results in a needing a new MD child page, rather than allocate the new MD child page at the time of the MD page split when creating in-memory metadata log entries or tuples (e.g., in the active one of the bucket sets 502, 504), control can proceed from the step 1202 to a step 1204. An ALI can be generated in the step 1204 for the new unallocated MD child page. The ALI can correspond to a new MD child page that has yet to be allocated or associated with physical storage. The new unallocated MD child page can be a child of the existing MD page. The ALI can be used as a temporary placeholder for the unallocated MD page until physical storage for the MD page is allocated during destaging. Additionally, at destaging once the MD child page is allocated, a new LI is determined and mapped to the MD child page, and then the new LI is associated with the ALI. In at least one embodiment, each occurrence or reference of the ALI in an entry of the in-memory metadata log being destaged can be replaced with the new LI.

In at least one embodiment, when an ALI is generated in the step 1204, processing can proceed from the step 1204 to the step 1206 where a corresponding entry can be made in the in-memory metadata log (e.g., active one of the bucket sets 502 504) and the MD log 510 (e.g., stored in non-volatile memory). The corresponding entry can denote an intended mapping from the generated ALI and a new LI which can potentially be generated at destage time when the new child MD page is allocated and associated with the new LI. In at least one embodiment, the entry recorded in the step 1206 for the generated ALI can be an "ALI MappedTo LI delta entry" or tuple, sometimes referred to herein as the ALI to LI mapping entry. In at least one embodiment, the ALI to LI mapping entry can be a tuple which includes the ALI as an invalid LI value in the LI field of the tuple. For example, consider the case where the child MD page for which the ALI is generated rather than allocated the child MD page L12 having the parent MD page L11. In this case, let ALI 12 denote the ALI generated and associated with the unallocated MD page L12. Rather than allocate the MD page L12 when splitting the parent MD page L11, an ALI to LI mapping entry or tuple can be recorded in the in-memory metadata log as follows: LI field=ALI L12; EI=N/A (not applicable); T=indicates tuple type of ALI to LI mapping; and V=an invalid LI value such as, for example, the ALI L12. The ALI to LI mapping tuple can be added to the ALI bucket, such as corresponding to the generated ALI L12, of the in-memory metadata log or the active bucket set 502, 504.

In at least one embodiment, the foregoing ALI to LI mapping tuple can be stored in the the in-memory metadata log (e.g., active bucket set) and also the MD log 510 as part of the committing the update or modification to the MD pages in connection with committing the write operation such as the write operation to the LUN 1002 described above in connection with FIG. 7B. The ALI to LI mapping tuple can be added to the particular bucket of the active bucket set 502, 504, where the particular bucket can be indexed by the ALI value. In this case, the ALI to LI mapping tuple can be indexed, looked up and/or retrieved using the ALI value as the lookup or retrieval key or index.

In at least one embodiment, the generated ALI value can be used in all tuples or entries of the in-memory metadata log (e.g., and also the MD log 510) which reference the new currently unallocated MD child page. Thus, control can proceed from the step 1206 to a step 1208 where one or more other entries or tuples can be included in buckets of the currently active bucket set, where each such other entry denotes a MD page update, and where each such other entry references the ALI. The one of the other entries can include, for example, an update to the unallocated new MD page such as to modify an address or pointer stored in an entry of the unallocated new MD page.

In at least one embodiment, the tuples or entries which can reference the ALI associated with the unallocated child MD page can include dependency tuples denoting the parent-child MD pages and the associated copy semantics (to copy data from the parent MD page to the child MD page). The dependency tuples can include the tuples denoting the IS A CHILD OF and IS A PARENT OF semantics discussed above. It should be noted that sometimes, the tuple denoting the IS A CHILD OF semantics can be referred to herein as the "IS CHILD OF" tuple, and the tuple denoting the IS A PARENT OF semantics can be referred to herein as the "IS PARENT OF" tuple. For example, reference is made back to the element 1040 of FIG. 7B with respect to the parent MD page L11 and the child MD page L12. In at least one embodiment, the L12 page is not allocated when creating entries in the in-memory metadata log for the pair of tuples denoting the dependency or parent-child relationship between L11 and L12. Rather, when creating entries in the in-memory metadata log for the IS CHILD OF tuple and the IS PARENT OF tuple, an ALI can be generated for the unallocated MD page L12. For example, the generated ALI can be represented as ALI L12 and the tuples of the in-memory metadata log can represent the following: ALI L12 IS A CHILD OF L11; and L11 IS A PARENT OF ALI L12.

In at least one embodiment, the tuples or entries which can reference the ALI associated with the unallocated child MD page can also include other tuples of different types. For example with reference back to the element 1040 of FIG. 7B, a tuple can also be included in the in-memory metadata log which updates an entry of L2:E1 to point to the data block or physical storage location where the newly written content is stored. This tuple can include an LI=ALI L12; EI=E1; T=an appropriate defined type; and V=the address or pointer to the data block or physical storage location including the newly written content.

When destaging entries or tuples from the in-memory metadata log (e.g., destaging entries from a bucket set having an associated role of inactive or destaging), in response to an entry or tuple including a reference to an ALI, processing described below in connection with FIG. 7D can be performed. Generally, the processing can include allocating a MD page and an associated LI if the foregoing has not already been completed for the ALI. Allocating the MD page and determining the associated LI can be performed in connection with the first or initial reference to the ALI encountered when destaging a particular bucket set. Once the MD page has been allocated and the associated new LI for the MD page determined, the ALI to LI mapping tuple can be located and updated to include the new associated LI. For subsequent references to the same ALI in other entries of the bucket set being destaged, the same ALI of such entries can be replaced with the associated new LI for the allocated MD page mapped to the ALI, where the new LI can be obtained from the updated ALI to LI tuple for the ALI.

Figure 7D:
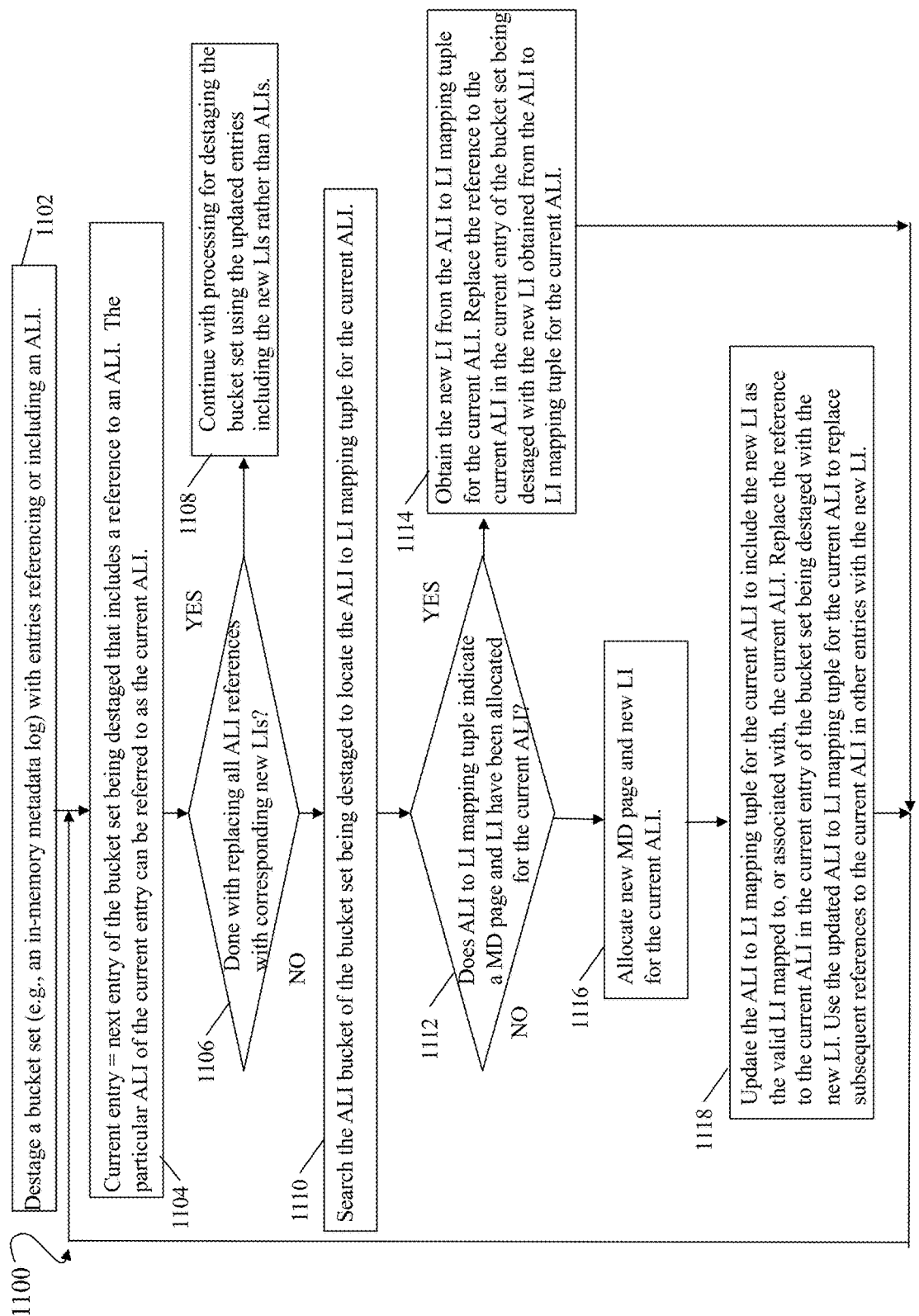

Referring to FIG. 7D, shown is a flowchart 1100 of processing steps that can be performed in at least one embodiment in accordance with the techniques of the present disclosure.

At a step 1102, processing can be performed to destaged a bucket set (e.g., an in-memory metadata log) with entries reference or including one or more ALIs. From the step 1102, control proceeds to a step 1104.

At the step 1104, a variable current entry is assigned the next entry of the bucket set being destaged that includes a reference to an ALI. The particular ALI of the current entry can be referred to in connection with subsequent processing steps of FIG. 7D as the current ALI. From the step 1104, control proceeds to the step 1106.

At the step 1106, a determination is made as to whether all ALI references in the bucket set being destaged have been replaced with corresponding new Us. If the step 1106 evaluates to yes, it means that there are no remaining ALIs included in entries of the bucket set being destaged whereby control proceeds from the step 1106 to the step 1108. At the step 1108, processing can continue with destaging the bucket set using the updated entries including the new Us rather than ALIs. If the step 1106 evaluates to no, control proceeds to a step 1110.

At the step 1110, processing is performed to search the ALI bucket of the bucket set being destaged to locate the ALI to LI mapping tuple for the current ALI. From the step 1110, control proceeds to a step 1112.

At the step 1112, a determination is made as to whether the ALI to LI mapping tuple located in the step 1110 indicates that a MD page and new LI have already been allocated for the current ALI. In at least one embodiment, whether a MD page and new LI for the current ALI have been allocated can be determined by examining the ALI to LI mapping tuple for the current ALI. In particular in such an embodiment, the tuple as described can include a V or value field which includes a valid LI if the MD page and new LI have already been allocated for the current ALI. Otherwise, the V or value field can include an invalid LI such as the ALI itself or another value denoting an invalid LI value.

If the step 1112 evaluates to yes, control proceeds to a step 1114. At the step 1114, processing can be performed to obtain the new LI from the ALI to LI mapping tuple for the current ALI. The step 1112 can include replacing the reference to the current ALI in the current entry of the bucket set being destaged with the new LI obtained from the ALI to LI mapping tuple for the current ALI. From the step 1114, control proceeds to the step 1104.

If the step 1112 evaluates to no, control proceeds to a step 1116 where processing can be performed to allocated a new MD page and a new LI for the current ALI. From the step 1112, control proceeds to a step 1116.

At the step 1116, processing can be performed to updated the ALI to LI mapping tuple for the current ALI (e.g., as located in the step 1110) to include the new LI as the valid LI mapped to, or associated with, the current ALI. The step 1116 can also include replacing the reference to the current ALI in the current entry of the bucket set being destaged with the new LI. The updated ALI to LI mapping tuple for the current ALI can be used to replace subsequent references to the current ALI in other entries with the new LI. From the step 1116, control proceeds to the step 1104.

In at least one embodiment, the processing described in connection with FIG. 7D (e.g., to allocate MD pages and new LIs for all ALIs in the bucket set being destaged, to update the ALI to LI mapping tuples of the bucket set being destaged, and the update and replace any ALI references to the new LIs in tuples of the bucket set being destaged) can be performed in a preprocessing phase 0 in connection with destaging the bucket set such as, for example, prior to performing phase 1 or the first phase of destaging of the bucket set, where the first phase of destaging is described elsewhere herein. In such an embodiment, all ALI references can be replaced with valid LIs associated with allocated MD pages prior to proceeding with the first phase of destaging of the bucket set.

In at least one embodiment, each ALI can be unique within the context of a single bucket set (e.g., single instance of an in-memory metadata log). As discussed above, such as in connection with FIG. 7A, the bucket sets 502 and 504 can be switched and alternate in connection with designation as an active bucket set and a destaging or inactive bucket set. Thus, for example in at least one embodiment, each ALI used in the single bucket set 502 is guaranteed to be unique with respect to any other ALI in the bucket set 502; and each ALI used in the single bucket set 504 is guaranteed to be unique with respect to any other ALI in the bucket set 504. However, ALI uniqueness in such an embodiment may not span across bucket sets 502 and 504 in such an embodiment.

As discussed above, such as in connection with FIG. 2, each appliance in the system can be a dual node appliance. In at least one embodiment, each node can independently generate or allocate ALIs without any inter-node synchronization. In at least one embodiment, a node can restart or reinitialize an ALI allocation algorithm or technique described below in more detail in response to switching the role or designation of active bucket set and inactive or destaging bucket set between the two bucket sets 502, 504 on the node. Thus, for example, one field of each ALI (e.g., field 904d of the example 900 discussed below) can include a sequence number where the sequence numbers can be included in a monotonically increasing sequence. A node can generate the sequence numbers by executing code of a sequence number generator that, for example, increments a current node local variable by one (1) each time a new sequence number is generated, and then uses the new sequence number in generating a new ALI. In at least one embodiment, the sequence number generator can be reset or reinitialized, whereby the node location variable can be reset to 0, each time the bucket sets 502, 504 of the node switch roles or designations of active and inactive or destaging.

Figure 7E:
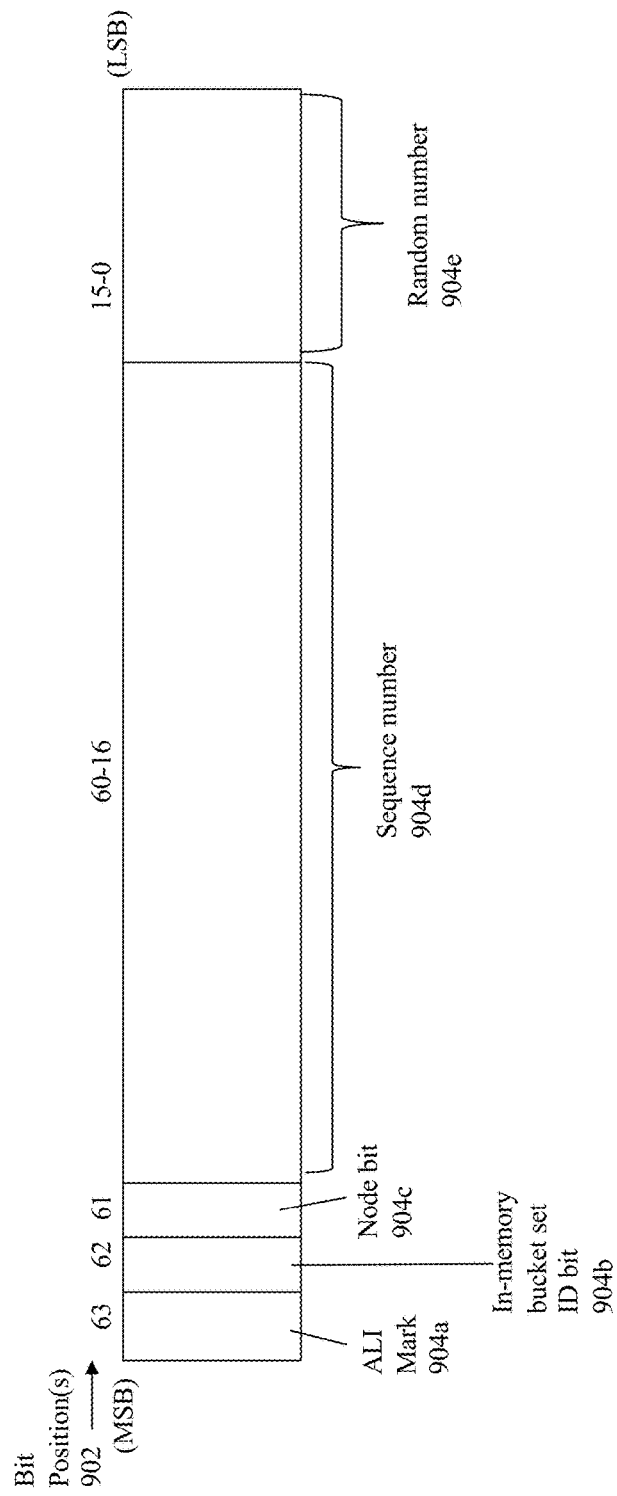
FIG. 7E is an example illustrating a layout of fields of an ALI in at least one embodiment in accordance with the techniques of the present disclosure.

Referring to FIG. 7E, shown is an example 900 illustrating an example of fields that can be included in a data layout of an ALI in at least one embodiment in accordance with the techniques of the present disclosure.

The example 900 illustrates an ALI that is 64 bits in size. More generally any suitable size ALI having any suitable number of bits can be used where the ALI can generally include the fields 904a-e.

In the example 900, the ALI data layout illustrates the fields 904a-e where the bit position 63 denotes the MSB (most significant bit position) and the bit position 0 denotes the LSB (least significant bit position).

The field ALI mark 904a can be a single bit value, such as stored in the MSB or $63^{rd}$ bit position having a value of 1 for all ALIs. Consistent with other discussion herein in at least one embodiment, all ALIs can be distinguished from Us in that all ALIs can have an MSB=1 and all Us can have an MSB=0.

The in-memory bucket set ID (identifier) (sometimes referred to as bucket set ID) bit 904b can be a single bit value denoting the current LSB of the bucket set ID of the currently active bucket set 502, 504 of the node. The bucket set ID bit can be a single bit value at bit position 62 of each ALI generated by a node. In at least one embodiment, each of the bucket sets 502, 504 of the node can be assigned a unique bucket set ID each time the bucket set becomes the active bucket set, or rather after the bucket set is destaged and thus transitions from the role of inactive or destaging bucket set to the role of active bucket set. The bucket set IDs assigned to the buckets sets 502, 504 can be monotonically increasing such as, for example, by simply incrementing the current bucket ID by one (1) each time a new bucket ID is assigned to a bucket. For example at a first point in time on a node, the bucket set 502 can be active, the bucket set 504 can be inactive, the bucket set 502 can have a bucket ID=1, and the node's corresponding bucket set ID bit 904b=1. At a second point in time subsequent to the first point in time, the bucket 502 becomes the inactive set being destaged and the bucket 504 becomes the active set and is assigned a bucket ID=2. At the second point in time, the node's corresponding bucket set ID bit 904b=0. At a third point in time subsequent to the second point in time, the bucket 504 becomes the inactive set being destaged and the bucket 502 becomes the active set and is assigned a bucket ID=3. At the third point in time, the node's corresponding bucket set ID bit 904b=1.

The node bit 904c can be a single bit value included at bit position 61 of each ALI generated by a node. In at least one embodiment, each of the two nodes of the dual node appliance can be associated with or assigned a bit value of 0 or 1. For example, assume that one of the nodes is designated as node A and the peer node is designated as node B. In at least one embodiment, the node A can be assigned a node bit value of 0 so that any ALI generated by the node A includes a node bit value 904c=0; and the node B can be assigned a node bit value of 1 so that any ALI generated by the node B includes a node bit value 904c=1. Of course, the assigned node bit values of the nodes can be the opposite of that just described whereby node A generates ALIs with a node bit value 904c=1 and node B generates ALOs with a node bit value 904c=0.

The sequence number field 904d can occupy bit positions 16-60 of each ALI generated by a node. More generally, the sequence number field 904d can occupy any suitable number of bit positions of each ALI. For example, in at least one embodiment, the sequence number field 904d can generally be between 24 and 32 bits in size and does not have to occupy all of the bit positions 16-60 of each ALI. In such an embodiment, each ALI can have a number of unused bit positions. As noted above, a node local variable, next_ALI_index, can be maintained locally on each node where next_ALI_index can be initialized or zeroed out each time there is a role switch between the bucket sets 502, 504 on the node whereby the buckets alternate between the roles of active set and inactive or destaging set. Each time an ALI is generated or allocated by the node, the next_ALI_index of the node can be incremented and then associated with the next generated ALI. In particular, the current value of next_ALI_index can be assigned to field sequence number 904d of the generated ALI. Thus, the next_ALI_index is incremented each time a new ALI is generated and included as a field in of the newly generated ALI.

The random number field 904e can occupy bit positions 0-15 (e.g., 16 bits in size) of each ALI generated by a node. More generally, the random number field 904e can occupy any suitable number of bit positions of each ALI. For example, in at least one embodiment, the field 904e can generally be between 16 and 24 bits in size. For example, if the field 904e is larger than 16 bits in size, the field 904e can occupy some bit positions currently illustrated in the example 900 as included in the field 904d. In this case, the size of the field 904d can be less than the number of bit positions as denoted in the example 900. In at least one embodiment, the node can generate a random number using any suitable random number generator providing an approximately (e.g., within specified tolerances or limits) even distribution of ALIs among the different buckets of a bucket set.

In at least one embodiment, each ALI generated by a node can be constructed based on a concatenation of the fields 904a-904e as illustrated in the example 900. More generally, each ALI generated by a node can include the fields 904a-904e. Some embodiments can include a modified layout for each generated ALI that, for example, includes one or more of the fields 904a-e in different corresponding bit positions and/or with different fields sizes than as illustrated in the example 900.

In at least one embodiment, one or more optimizations can be optionally included in an embodiment in accordance with the techniques of the present disclosure. In at least one embodiment, an optimization can be included to reduce the overhead incurred at destaged time where the overhead is associated with allocating metadata pages for ALIs which are converted to corresponding Us as part of destaging as discussed elsewhere herein. In one embodiment without the optimization, the node can perform processing to allocate each individual metadata page for each converted ALI at destaged time. Each such individual metadata page allocation can incur overhead, for example, in the particular one or more allocation routines invoked at runtime, the locking or synchronization overhead that can be incurred in connection with any shared resource such as the physical storage of the BE PDs from which physical storage is allocated for an allocated metadata page, and the like.

To reduce the foregoing overhead, one optimization that can be performed includes allocating physical storage, such as from the BE PDs or the MD page store 540, for a chunk of multiple metadata pages with a single allocation, for example, using the particular one or more allocation routines. In this case, the node can obtain a chunk of physical BE storage with the single allocation request and then can further utilize and locally allocate individual metadata pages from the chunk. The node's local allocation of individual metadata pages from the larger chunk of physical storage can reduce the runtime overhead otherwise incurred by making multiple calls or allocation requests to the allocation routine at runtime. In one aspect, the chunk of BE physical storage can be characterized as a metadata page heap which can then be further managed and allocated locally by the node. In at least one embodiment, the node can track or count the number of ALIs within a particular bucket set where the count indicates the number of ALIs, and thus metadata pages, that are expected to be allocated at destage time. For example in at least one embodiment, the metadata pages can be allocated in connection with the first phase of destaging. Generally, the metadata pages can be allocated at any suitable time in connection with destaging. More generally, the metadata pages can be allocated at any suitable time which can also include prior to destaging and/or during one of the destaging phases as discussed elsewhere herein.

In at least one embodiment, the above-noted optimization can include tracking or counting the number of ALIs within a bucket set with the expectation that a new metadata page will be allocated for each of the ALIs when destaging the bucket set. The node can allocate a chunk of physical storage sufficient to accommodate the number of ALIs and then perform node local or internal allocation of metadata pages from the chunk as each such ALI is processed in connection with destaging the bucket set. As a variation, an embodiment can have the node partition the count denoting the total number of ALIs and thus the number of expected metadata page allocations needed into groups of a particular size. For example, in at least one embodiment, the node can partition the count into groups of size N, where N denotes a number of metadata pages such as 64. The node can then allocate chunks of physical storage for the metadata pages where each chunk can be the size of 64 metadata pages. In this latter case, it may be that the count does not evenly divide by N whereby perhaps one chunk allocated can be less than 64 for the remaining or last chunk of metadata page physical storage allocated. As the node consumes and locally allocates metadata pages from a first allocated chunk, the node can also track the number of currently allocated metadata pages for the particular bucket set and compare that to the count so that the node does not excessively allocated physical storage for more metadata pages than needed for the particular bucket set. Once the node consumes all the physical storage from the first allocated chunk, the node can request a second chunk of physical storage for more metadata pages. In at least one embodiment, the chunk of physical storage used for metadata pages can be partitioned and stored in a structure such as an array with N entries where each of the N entries can be associated with physical storage for a single metadata page. Once the node locally allocates the physical storage of the Nth entry of the array for use as a new metadata page, the node can make a next request for a next chunk of physical storage for N metadata pages.

Consistent with other discussion herein in at least one embodiment, the above-noted metadata page allocation for ALIs can be performed when destaging a first bucket set, where such ALIs are associated with a snapshot which has not been deleted within a single life span or cycle of the first bucket set as the active bucket set. In at least one embodiment in accordance with the techniques of the present disclosure, if the ALIs are associated with a snapshot which is created and deleted within the single cycle or the amount of time that the first bucket set was designated as the active bucket set, then there is no need to allocate metadata pages. Each ALI corresponds to an unallocated metadata page. In at least one embodiment, a node can track the ALIs for such unallocated metadata pages associated with a particular snapshot within a single bucket set. Thus, when and if the particular snapshot is deleted, any buckets of the buckets corresponding to the ALIs associated with the particular snapshot can be deleted or ignored, and additionally, any references by other tuples to such ALIs of the particular snapshot can also be deleted from bucket set or otherwise ignored.

In at least one embodiment of the techniques of the present disclosure, unnecessary metadata page allocations can be avoided in connection with snapshot-related processing. In at least one embodiment, the metadata pages for ALIs in a bucket set can be allocated when the bucket set is destaged and only for those ALIs which are associated with snapshots that have not been deleted prior to destaging the bucket set.

What will now be described are techniques that can be used in connection with servicing I/Os and reads and writes with respect to metadata of a MD page.

The techniques described in the following paragraphs provide for reading one or more MD pages, or portions thereof. Consistent with other discussion herein, a node can receive an I/O operation, such as a read I/O operation, that reads user data from a target logical address, such as from a LUN and an LBA or offset on the LUN. In connection with processing or servicing the read I/O operation, the node can read metadata from one or more MD pages to obtain the requested read data. The one or more MD pages can be used, for example, to map the target logical address to the corresponding physical storage location of the requested read data. The node can receive an I/O operation, such as a write I/O operation, that writes user data to the target logical address. In connection with processing or servicing the write I/O operation, the node may also need to read metadata from one or more MD pages.

Figure 8:
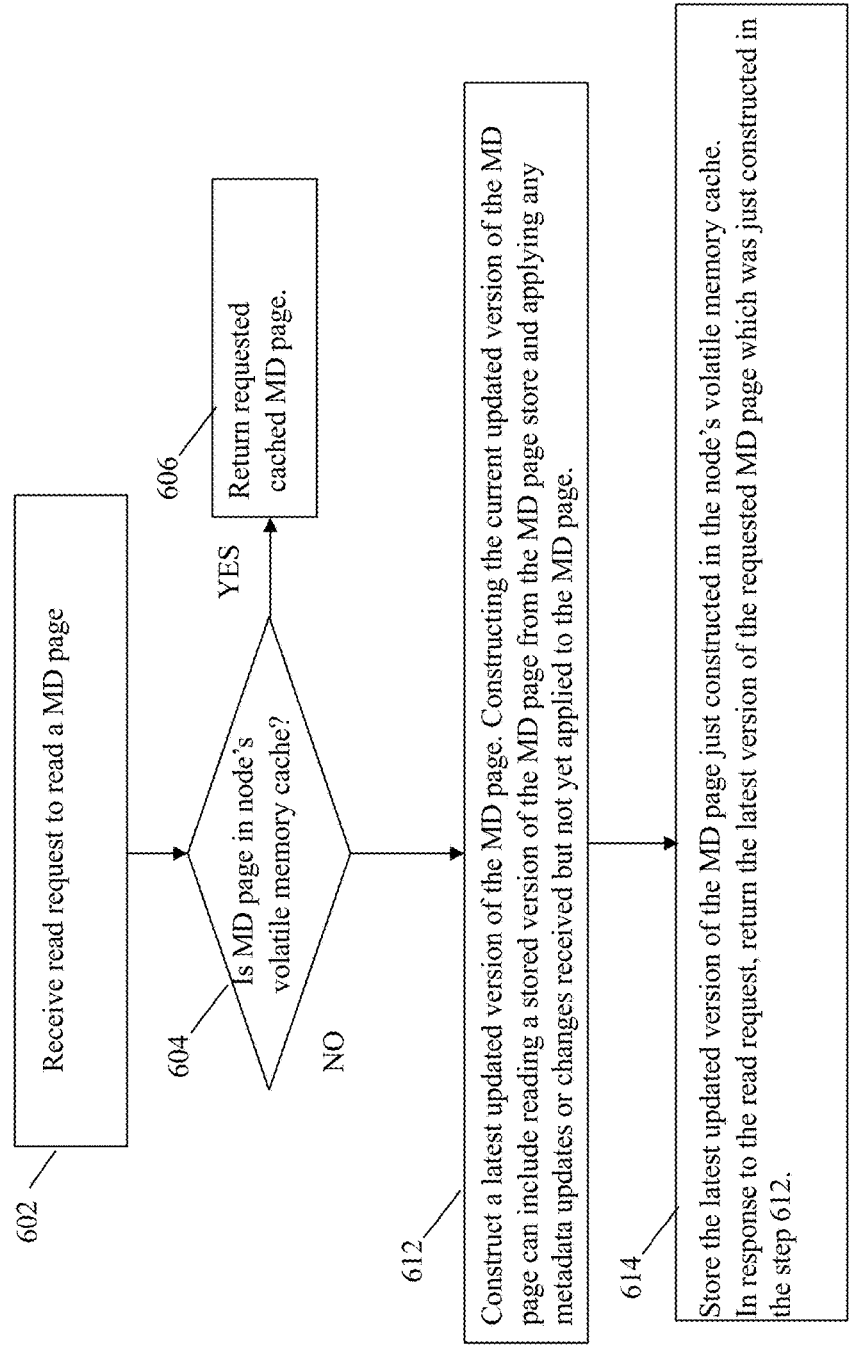

Referring to FIG. 8, shown is a flowchart 600 of processing steps that can be used in connection with servicing a read request to read metadata from a MD page.

At the step, 602 a node may receive a read request for a MD page. From the step 602, control proceeds to the step 604.

At the step 604, a determination is made as to whether the MD page is currently stored in the node's volatile memory cache. If the step 604 evaluates to yes, a read cache hit is determined with respect to the requested MD page. If the step 604 evaluates to no, a read cache miss is determined with respect to the MD page and read cache miss processing can be performed. If the step 604 evaluates to yes, control proceeds to the step 606.

At the step 606, processing is performed to return a response to the read request received in the step 602. Processing of the step 606 can include retrieving the requested MD page from the node's local volatile memory cache MD, and returning the requested MD page in response to the read request.

If the step 604 evaluates to no, control proceeds to the step 612. At the step 612, processing can be performed to construct the latest version of the requested MD page. Constructing the current version of the MD page C1, where C1 can denote the LI of the current MD page, can include determining whether the bucket C1 in the currently active bucket set includes any entries or tuples which generally require further processing or resolution before the current MD page C1 can be constructed. If there are no such entries or tuples requiring further processing or resolution before constructing C1, then the step 604 can include reading a stored version of the MD page from the MD page store of the BE PDs, and applying any metadata updates or changes received but not yet applied to the MD page. The metadata updates for the MD page can be aggregated from the in-memory or volatile memory structures of the node's volatile memory 501 (e.g., the in-memory metadata log from the bucket sets 502, 504 of the volatile memory 501 of the nodes) and also from the BE PDs 542. In particular, the metadata updates for the MD page can be aggregated and merged from the bucket sets 502 and 504 (e.g., the node's in-memory metadata log), and also from the destaged bucket sets 524. The metadata updates for the particular MD page can be retrieved based on the LI uniquely associated with the MD page, where the LI is mapped uniquely to a particular bucket in each of the bucket sets 502, 504, and each of the bucket sets of 524. Consistent with other discussion herein, the metadata updates for the MD page can be aggregated and merged. A stored version of the MD page can be retrieved from the MD page store 540, and the merged metadata updates from the MD page can then be applied to the stored version of the MD page to thereby obtain the latest version of the MD page.

In at least one embodiment, the entries or tuples requiring further processing or resolution before the current version of the MD page C1 can be constructed can include an IS A CHILD tuple located in the bucket C1 of the active bucket set. The step 604 can include searching the bucket C1 of the currently active bucket set for any IS A CHILD entries or tuples indicating that C1 IS A CHILD of some other parent MD page. For example, assume the bucket C1 contains and IS A CHILD tuple indicating that the MD page C1 is a child of the parent MD page P1. In this case, the parent MD page P1 can be reconstructed to include content or changes received up to the moment of the MD page split. In reconstructing the parent MD page P1, processing can include: reading a current version of the parent MD page P1 from the MD page store 540 on the BE PDs, locating the tuple P1 IS A PARENT OF C1 in the bucket P1 of the active bucket set, and applying all deltas or changes to the parent MD page P1, where such deltas or changes are denoted by entries occurring in time prior to the P1 IS A PARENT OF C1 tuple in the bucket P1. In at least one embodiment, the entries on the buckets of the bucket sets can be sorted in increasing time order whereby the deltas or changes of the bucket P1 that are applied to the parent MD page P1 occur prior to the P1 IS A PARENT OF C1 tuple in the bucket P1. At this point, the parent MD page P1 has been reconstructed and can be used as a base for reconstructing the child MD page C1. In at least one embodiment, the contents of the reconstructed parent MD page can be copied to a temporary memory location, any deltas or changes to the MD child page C1 not yet applied to the MD page C1 can be applied to the temporary memory location, and the resulting contents of the temporary memory location denote the reconstructed child MD page C1. The metadata updates for the MD page C1 can be aggregated from the in-memory or volatile memory structures of the node's volatile memory 501 (e.g., the in-memory metadata log from the bucket sets 502, 504 of the volatile memory 501 of the nodes) and also from the BE PDs 542. In particular, the metadata updates for the MD page C1 can be aggregated and merged from the bucket sets 502 and 504 (e.g., the node's in-memory metadata log), and also from the destaged bucket sets 524. The metadata updates for the particular MD page C1 can be retrieved based on the LI=C1 uniquely associated with the MD page C1, where the LI is mapped uniquely to a particular bucket in each of the bucket sets 502, 504, and each of the bucket sets of 524. Consistent with other discussion herein, the metadata updates for the MD page C1 can be aggregated and merged. A stored version of the MD page C1 can be retrieved from the MD page store 540, and the merged metadata updates from the MD page C1 can then be applied to the stored version of the MD page to thereby obtain the latest version of the MD page C1.

It should be noted that the foregoing regarding processing performed to reconstruct the parent MD page P1 for use as a base in reconstructing P1's child MD page C1 denotes a single level of copying semantics. However, in some embodiments, multiple levels of copying semantics can be specified whereby a first parent MD page P1 can be a child of a second parent MD page P2 so that constructing P1 first requires constructing P2. In such an embodiment, the processing described above in connection with reconstructing the parent MD page P1 can be applied recursively or repetitively in connection with each parent MD page constructed.

From the step 612, control proceeds to the step 614.

At the step 614, the latest version of the MD page C1 just constructed can be stored in the node's volatile memory cache. In response to the read request, the latest version of the MD page just constructed and stored in the node's volatile memory cache can be returned.

As discussed above, the full MD page construction (e.g., step 612) to obtain a latest version of the requested MD page can occur when the requested MD page is not located in the node's cache.

What will now be described are techniques that can be performed in an embodiment in accordance with the present disclosure when processing MD page changes or updates for writes to one or more MD pages.

In connection with an active-active appliance or system such as described herein, the nodes should be synchronized to guarantee consistent access and updates of the same data and MD objects or MD pages from both nodes. For example, one particular method or protocol that can be used in connection with performing MD updates to one or more MD pages in at least one embodiment in accordance with the techniques herein is described in some detail herein and in further detail, for example, in U.S. application Ser. No. 17/243,252, filed on Apr. 28, 2021, "System and Method for Consistent Metadata Access Based on Local Locks Semantics in a Multi-Node Cluster", Shveidel, et al., (the '252 application) which is incorporated by reference herein in its entirety. More generally, any suitable technique can be used to synchronize and coordinate access and updates to the MD pages as stored in the in-memory delta logs of the node-local memories, the log stored on NVRAM that can be used to log user data and metadata updates, and the MD page store (e.g., as may be stored on the BE PDs).

The '252 application uses a technique to synchronize access and updates to shared MD pages among the two nodes of an appliance by combining locking and transactional update logic using a single round or message exchange between the two nodes. The general technique described in the '252 application has been adapted for use in connection with the techniques of the present disclosure. Additionally, an embodiment can generally use any suitable protocol in connection with the techniques of the present disclosure to synchronize access and updates to the shared MD pages among the two nodes of the dual node appliance.

What will now be described is processing that can be performed in connection with two nodes of the dual node appliance to synchronize access to one or more MD pages involved in a transaction. Thus, in this context and example described in the following paragraphs, updates to all of the one or more MD pages can be required for the transaction initiated by an initiator. The metadata updates to the one or more MD pages can be performed, for example, in connection with processing a write I/O received by the initiator node which is initiating the transaction of metadata updated applied to the one or more MD pages.

Figure 9A:
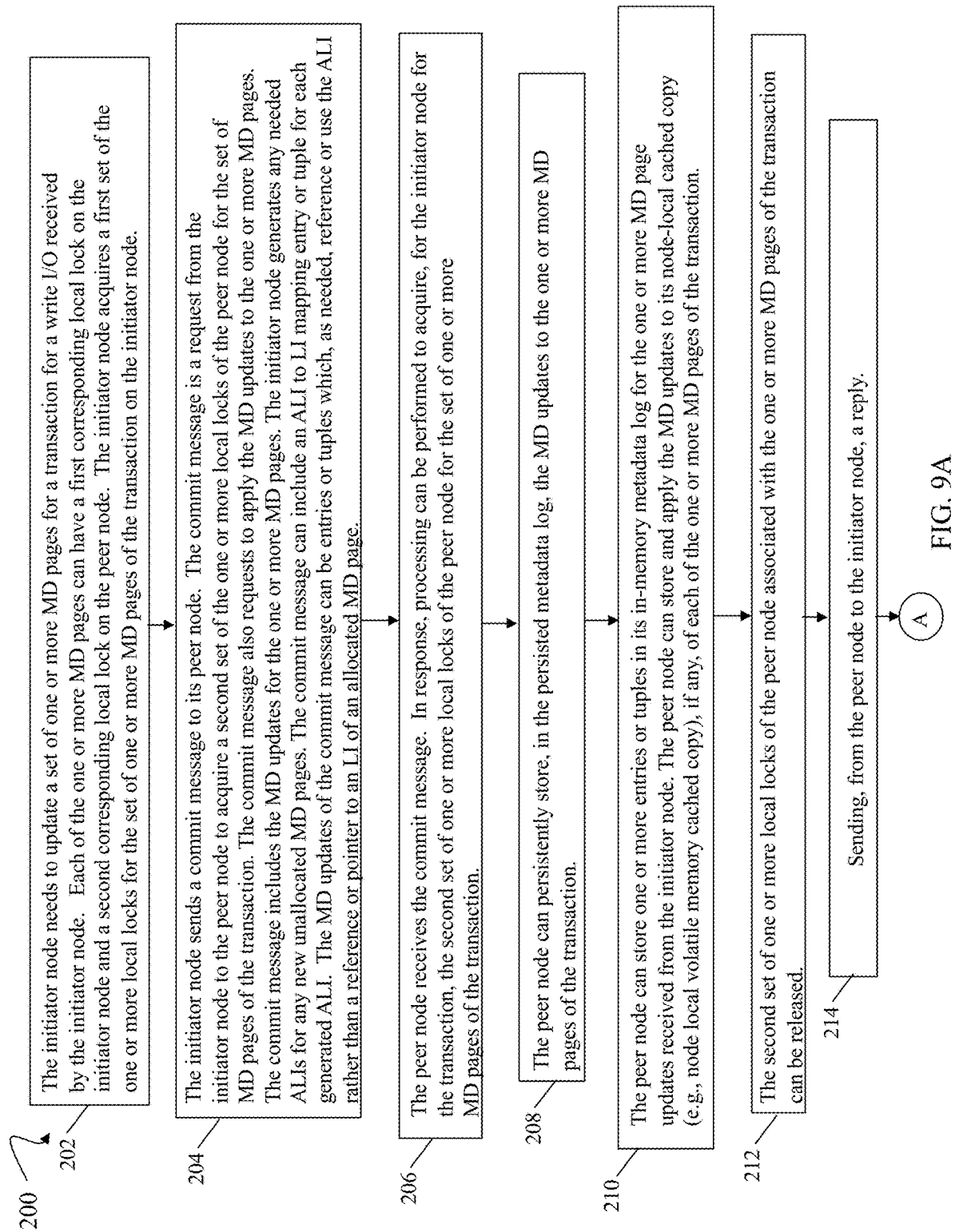
Figure 9B:
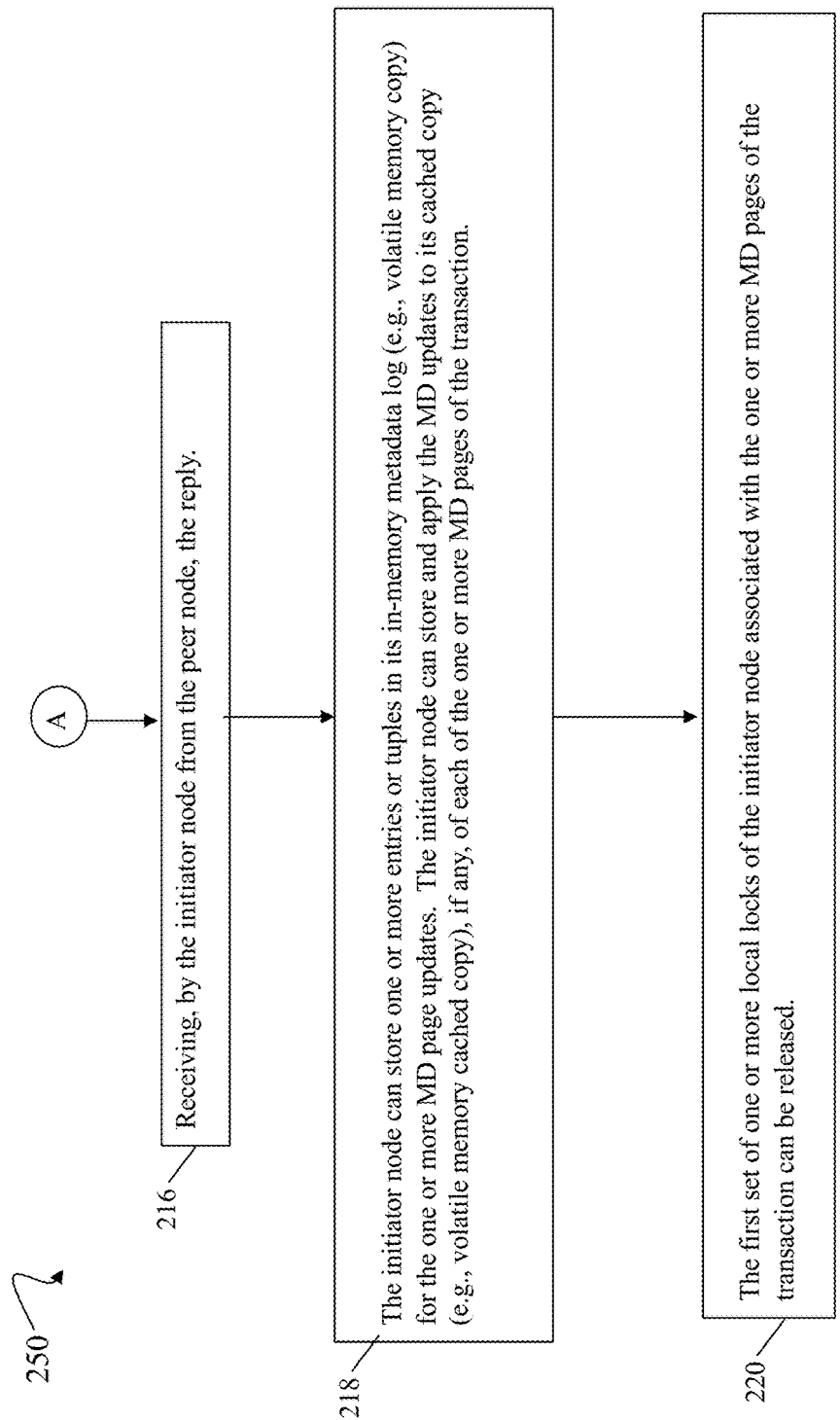

The flowchart of FIGS. 9A and 9B generally describes processing in which an initiator node (sometimes referred to simply as initiator) needs to perform updates on a set of one or more MD pages. Consistent with the '252 application, the flowchart of FIGS. 9A and 9B provides efficient "local" MD page lock semantics and schema. Specifically, the initiator node and its peer node (sometimes referred to simply as a peer) can each have their own local locks for MD pages accessible to both nodes. A request by an initiator node for the local lock for a MD page on the initiator node is a request for exclusive access to the MD page that is node local (e.g., within the scope of the initiator node). A request by an initiator node for the local lock for a MD page on its peer node is a request for exclusive access to the MD page that is node local (e.g., within the scope of the node). Thus local locks of one node can be acquired separately with no dedicated internode lock synchronization between nodes. For each MD page, the initiator node can have a first corresponding local lock and the peer node may have a second corresponding local lock. An initiator node that needs to apply an update to a particular MD page and requires exclusive access to the particular MD page must acquire the first local lock of the initiator node for the particular MD page and also acquire the second local lock of the peer node for the particular MD page prior to applying the update. Once the initiator node has acquired the local lock of the initiator node for the MD page and the local lock of the peer node for the MD page, the initiator node has exclusive access to the MD page and the update can be applied to the MD page. Once the update to the MD page has been applied, the local locks of the initiator node and the peer node previously acquired for the MD page can be released.

The local lock for a MD page can be characterized as local with respect to a single node for the MD page and can be used to provide lock semantics and serialization of access in the scope of only the single node. Thus, in order for a node in a dual node appliance to acquire exclusive access to a MD page, the node needs to acquire a first local lock for the MD page from a first of the two nodes and also acquire a second local lock for the MD page from the remaining node (e.g., a second of the two nodes).

Referring to FIGS. 9A and 9B, shown is a flowchart of processing steps that can be performed in an embodiment in accordance with the techniques herein. Consistent with other discussion herein, the FIGS. 9A and 9B describe processing that can be performed in connection with one particular protocol of the '252 application using a single round of message-reply exchange between an initiator node and its peer node when the initiator node performs processing to service a transaction and apply updates to one or more MD pages of the transaction.

At the step 202, the initiator node needs to update a set of one or more MD pages for a transaction such as, for example, for a write I/O received by the initiator node. The write I/O can write user data or write data to a target logical address expressed as a LUN and LBA. In this case, to service the write I/O operation, the initiator node performs metadata updates to set of one or more MD pages used to map the target logical address to a physical location where the new user data or write data is stored. In at least one embodiment such metadata updates to the MD pages used to access the physical storage location mapped to the target logical address where the new write data is written can be performed when destaging the write data or user data to the BE PDs providing the non-volatile storage for the write data or user data.

The set of one or more MD pages can be included in the MD pages of the MD mapping information or structure (e.g., such as described in connection with FIGS. 3, 4, 5 and 6). Each of the one or more MD pages can have a first corresponding local lock on the initiator node and a second corresponding local lock on the peer node. In the step 202, the initiator node acquires a first set of the one or more local locks for the set of one or more MD pages of the transaction on the initiator node. From the step 202, control proceeds to the step 204.

At the step 204, the initiator node sends a commit message to its peer node. The commit message is a request from the initiator node to the peer node to acquire a second set of the one or more local locks of the peer node for the set of MD pages of the transaction. The commit message also requests to apply the MD updates to the one or more MD pages. The commit message in this protocol illustrated also includes, as a commit message payload, the MD updates (e.g., updated metadata or content) for the one or more MD pages. The step 204 can also include the initiator node generating ALIs, if needed, in connection with an unallocated new MD pages. Consistent with other discussion herein, the tuples or entries for the MD updates created by the initiator node can use ALIs, if any, generated by the initiator node, where such ALIs are included in the tuples or entries of the commit message payload sent to the peer node. For each of the ALIs generated by the initiator node in the step 204, the initiator node can include an ALI to LI mapping tuple or entry in the commit message payload and also in its in-memory metadata log (e.g., stored in the subsequent step 218). As discussed elsewhere herein, a new MD page can be needed, for example, as a result of performing a MD page split of an existing MD page. The MD updates of the commit message can be entries or tuples which, as needed, reference or use the ALI rather than a reference or pointer to an LI of an allocated MD page. From the step 204, control proceeds to the step 206.

At the step 206, the peer node receives the commit message. In response, processing can be performed to acquire, for the initiator node for the transaction, the second set of one or more local locks of the peer node for the set of one or more MD pages of the transaction. From the step 206, control proceeds to the step 208.

At the step 208, the peer node can persistently store, in the persisted metadata log 510, the MD updates to the one or more pages of the transaction. In at least one embodiment, the commit message payload can include the tuples or entries recorded for the MD updates, where the tuples or entries are created by the initiator node (e.g., step 204) and sent to the peer node (e.g., step 206). The peer node can store in the persisted metadata log 510 the MD updates to the one or more pages of the transaction by storing the tuples or entries of the commit message payload received from the initiator node. Generally, the peer node can store the tuples or entries received "as is" from the initiator node without any changes. From the step 208, control proceeds to the step 210.

At the step 210, the peer node can store one or more entries or tuples in its in-memory metadata log (e.g., in the peer node's volatile memory) for the one or more MD page updates received from the initiator node. The peer node can store in its in-memory metadata log (e.g., active bucket set in the peer node's volatile memory) the MD updates to the one or more pages of the transaction by storing the tuples or entries of the commit message payload received from the initiator node (e.g., received in the step 206). Generally, the peer node can store the tuples or entries received "as is" from the initiator node without any changes thereby using and storing the tuples with the ALIs generated by the initiator node. In at least one embodiment, the in-memory metadata logs of the initiator node and the peer node can mirror each other in that the in-memory metadata logs of the initiator and peer nodes can represent the same MD updates. The peer node can store and apply the MD updates to its node-local cached copy (e.g., node local volatile memory cached copy), if any, of each of the one or more MD pages of the transaction. Consistent with other discussion herein, the tuples or entries for the MD updates of the peer node can use ALIs, if any, previously generated by the initiator node, where such ALIs are included in the tuples or entries of the commit message payload sent in the prior step 204. For each of the ALIs generated by the initiator node in the step 204, the initiator node can include an ALI to LI mapping tuple in its in-memory metadata log. As discussed elsewhere herein, a new MD page needed, for example, as a result of performing a MD page split of an existing MD page. In this case at a subsequent destage time, the new MD page can be allocated and the existing MD page contents copied to the new MD page if a LUN, snap or other entity exclusively owning or using the new MD page has not been deleted. From the step 210, control proceeds to the step 212.

At the step 212, the second set of one or more local locks of the peer node that are associated with the one or more MD pages of the transaction can be released. From the step 212, control proceeds to the step 214.

At the step 214, a reply message can be sent from the peer node to the initiator node indicating completion of the commit processing by the peer node. From the step 214, control proceeds to the step 216.

At the step 216, the initiator node receives the reply from the peer node. From the step 216, control proceeds to the step 218.

At the step 218, the initiator node can store one or more entries or tuples in its in-memory metadata log (e.g., volatile memory copy) for the one or more MD page updates received from the initiator node. The initiator node can store and apply the MD updates to its cached copy (e.g., volatile memory cached copy), if any, of each of the one or more MD pages of the transaction. As noted above, the entries or tuples stored in the initiator node's in-memory metadata log can include generated ALIs as appropriate for any entry or tuple referencing an unallocated MD page. In at least one embodiment in connection with the step 218, the initiator node can generate an ALI for any tuple or MD update in its in-memory metadata log which references an unallocated MD page. For each generated ALI, the initiator node can store an entry in its in-memory metadata log an ALI to LI mapping tuple. Such tuples referencing an ALI can include, for example, any tuple which denotes an update to a new MD page that is not allocated until destaging, and can include entries or tuples used in connection with a parent-child relationship between two MD pages (e.g., where the tuples can include an "IS CHILD OF" tuple and/or an IS PARENT OF tuple). As discussed elsewhere herein, the allocation of the MD page can be deferred until destaging and where the MD page is allocated during destaging, if the snapshot or other entity which owns (e.g., does not share with another snapshot or LUN) and exclusively uses the MD page has not been deleted. The ALI generated by the initiator node for an unallocated MD page can be used by the initiator node in connection with the creating and storing other entries or tuples which reference the unallocated MD page. From the step 218, control proceeds to the step 220.

At the step 220, the first set of one or more local locks of the initiator node associated with the one or more MD pages of the transaction can be released.

In connection with a local lock requested by an initiator node, such as in connection with the steps 202 and 206, if the requested local lock for a MD page is not available and is currently held by a node in connection with another transaction, processing for the request by the initiator can be blocked and wait in a queue associated with the local lock. In at least one embodiment, if there are multiple requests for multiple transactions blocked and waiting for the local lock, the multiple requests can be placed in the queue in a FIFO (first in first out) order in accordance with the time order in which the multiple requests attempted to acquire the local lock. In response to releasing the local lock of the FIFO queue, a next waiting request, if any, from the queue can proceed to attempt to acquire the local lock of the peer node for the transaction associated with the next waiting request. For example, such a queue as just described can be used in connection each local lock of an initiator node when attempting to acquire its own one or more local locks for one or more MD pages of the transaction in the step 202. Additionally, such a queue as just described can be used in connection each local lock of a peer node when attempting to acquire, on behalf of the commit request from the initiator node for a transaction, one or more local locks of the peer node for the one or more MD pages of the initiator's transaction in the step 206.

In connection with the foregoing description in FIGS. 9A and 9B, the initiator node receiving the write I/O operation can initiate updating the set of MD pages associated with accessing data stored on a particular LUN and can record (e.g., in the step 218) all the metadata updates to the set of MD pages in entries of its in-memory metadata log. In connection with the foregoing description in FIGS. 9A and 9B, the peer node that does not receive the write I/O operation or more generally does not initiate the updating of the set of MD pages associated with accessing data stored on a particular LUN can record (e.g., in the step 210) all the metadata updates to the set of MD pages in entries of its in-memory metadata log in entries or tuples.

Figure 10A:
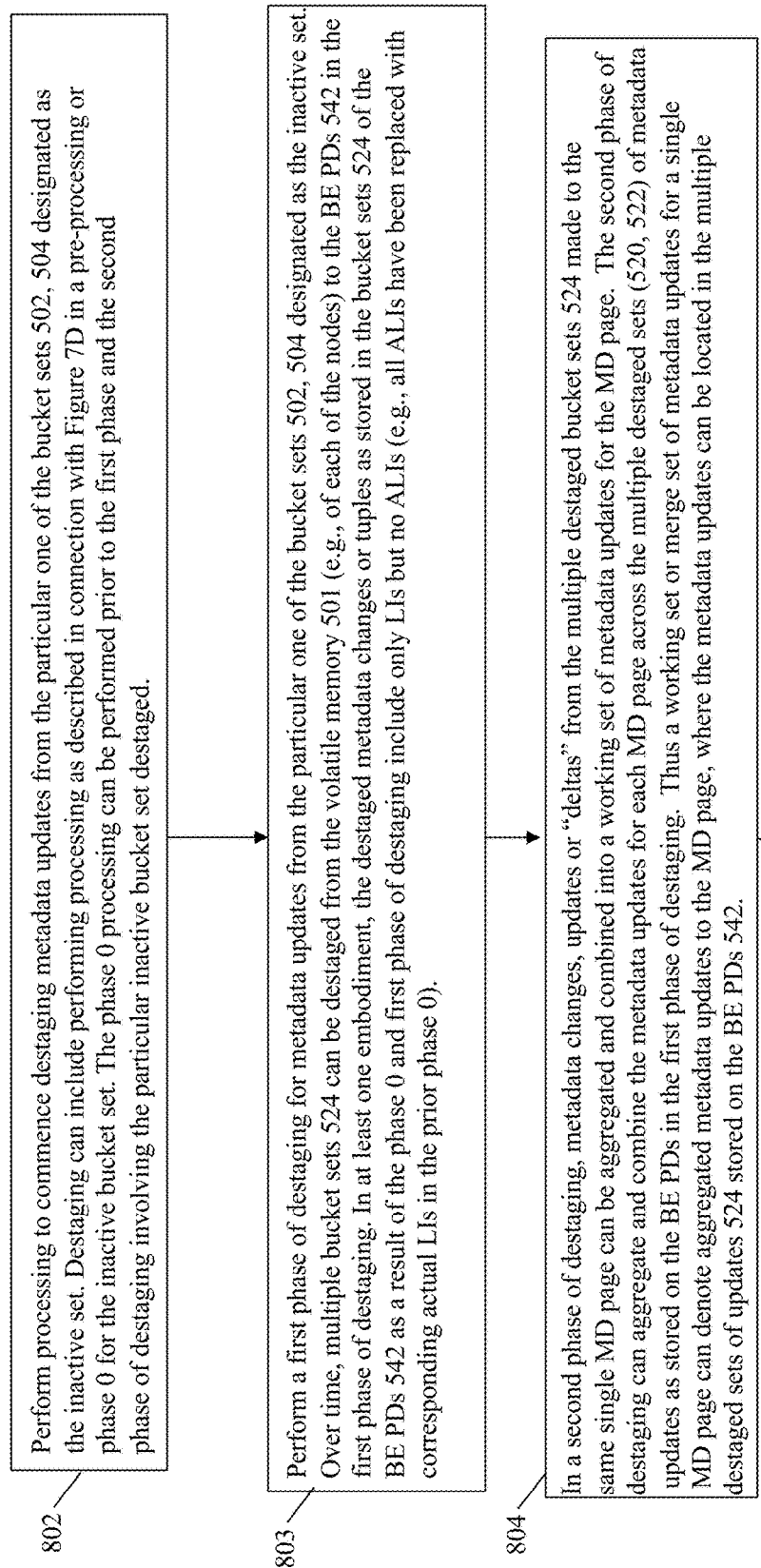

Referring to FIGS. 10A and 10B, shown is a flowchart 800, 850 of processing steps that can be performed in at least one embodiment in connection with destaging metadata changes in accordance with the techniques of the present disclosure. The flowchart 800, 850 generally summarizes processing described above, for example, in connection with FIG. 7A. The description below regarding the flowchart 800 is made with reference to elements of FIG. 7A.

At the step 802, processing can be commenced to destage metadata updates from the particular one of the bucket sets 502, 504 designated as the inactive set. Destaging can include performing processing as described in connection with FIG. 7D in a pre-processing or phase 0 of destaging the particular one of the bucket sets 502, 504 designated as the inactive set. The phase 0 processing can be performed prior to the first phase and the second phase of destaging involving the particular bucket set. From the step 802, control proceeds to the step 803.

At the step 803, a first phase of destaging can be performed by a node for metadata updates from the particular one of the bucket sets 502, 504 (e.g. the in-memory metadata log of the node) designated as the inactive set. Over time, multiple bucket sets 524 can be destaged from the volatile memory 501 (e.g., of each of the nodes) to the BE PDs 542 in the first phase of destaging. Thus, in at least one embodiment, the destaged metadata changes as stored in the bucket sets 524 BE PDs 542 as a result of the first phase of destaging may include no ALIs since such ALIs have been replaced in the prior phase 0 with the corresponding actual Us. From the step 802, control proceeds to the step 804.

At the step 804, in a second phase of destaging as can be performed by a node, metadata changes, updates or "deltas" from the multiple destaged bucket sets 524 made to the same single MD page can be aggregated and combined into a working set of metadata updates for the MD page. The second phase of destaging can include aggregating and combining the metadata updates for each MD page across the multiple destaged sets (520, 522) of metadata updates as stored in the destaged bucket sets 524 on the BE PDs 542 in the first phase of destaging. Thus a working set or merge set of metadata updates for a single MD page can denote aggregated metadata updates to the MD page, where the metadata updates can be located in the multiple destaged sets of updates 524 stored on the BE PDs 542. From the step 804, control proceeds to the step 806.

The steps 806, 808 and 810 are described in connection with a single MD page. More generally these same steps can be repeated for other MD pages. In at least one embodiment, the steps 806, 808 and 810 can also be processing steps included in the second phase of destaging.

At the step 806, processing can be performed to construct a current version of a MD page C2 using the working set of MD changes for the MD page C2 and a "base" upon which to apply the working set of MD changes. The "base" for the MD page C1 can vary depending on whether the working set of MD changes for the MD page includes any dependency denoted by an IS CHILD OF TUPLE which specifies the MD page C2 being constructed is the child of another parent MD page P2. If there is no such dependency tuple, the existing or current version of the MD page C2 can be read from the BE PDs and used as the "base".

In the step 806, if there is a dependency for the MD page C2 included in the working set of MD changes for the MD page C2, processing can be performed to resolve the dependency occurring in the working set of MD changes. The dependency can be denoted by an IS A CHILD OF tuple which specifies that the MD page C2 is the child of another parent MD page P2. In this case, the parent MD page P2 can be reconstructed and used as the "base" for the MD page C2. Assuming there is no dependency tuple for the parent MD page P2, the parent MD page P2 can be reconstructed by reading the current version of the parent MD page P2 from the BE PDs, and applying any updates made to the parent MD page P2 prior to the occurrence of the IS PARENT OF tuple included in the working set of MD updates for the parent MD page P2 (e.g., where the IS PARENT OF TUPLE indicates that the parent MD page P2 is the parent of the MD page C2). The reconstructed parent MD page P2 can be used as the "base" for constructing the MD page C2. Consistent with other discussion herein, it may be that the parent MD page P2 itself has a dependency denoted by another dependency tuple in P2's working set of MD changes whereby processing as described herein for the child MD page C2 can also be recursively or repetitively performed in connection with resolving multiple levels of dependencies (e.g., parent-child MD dependencies).

As result of the step 806, the "base" for the MD page C2 has been determined and then stored in a volatile memory location in the cache of the node. From the step 806, control proceeds to the step 808.

At the step 808, the node can perform processing to combine or apply the working set of metadata changes for the MD page to the "base" for the MD page (e.g., where the base can be obtained as a result of the step 806 processing) as stored in the node's cache to thereby result in an updated version of the MD page being stored in the node's cache. From the step 808, control proceeds to the step 810.

At the step 810, the node can store the updated MD page persistently in the MD page store 540 on the BE PDs thereby replacing the prior current or existing version of the MD page.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
   receiving a metadata (MD) structure including a plurality of MD pages; and
   performing a MD split operation with respect to a first of the plurality of MD pages, wherein said performing the MD split operation with respect to the first MD page includes:
   generating a first ALI (abstract logical index) representing a new MD page that is unallocated and is a child of the first MD page; and
   storing a first entry in a first bucket of an in-memory MD log for the first ALI, wherein the first entry denotes a mapping between the first ALI and a corresponding LI (logical index), wherein the first entry indicates that the corresponding LI associated with the first ALI is invalid since the first ALI represents a new MD page which is unallocated and not associated with physical storage; and
   destaging the in-memory MD log, wherein said destaging includes:
   allocating first physical storage for the new MD page.

2. The computer-implemented method of claim 1, further comprising performing first processing prior to said destaging, said first processing including:
   performing a first MD update to the new MD page; and
   storing a second entry in the first bucket of the in-memory MD log, where the second entry denotes the first MD update, and wherein the second entry references the first ALI to represent the new MD page that is unallocated.

3. The computer-implemented method of claim 2, wherein said destaging further includes:
   determining that the second entry of the first bucket of the in-memory MD log references the first ALI;
   searching the first bucket of the in-memory MD log for the first entry denoting the mapping between the first ALI and a corresponding LI, wherein the first ALI maps to the first bucket and wherein the first bucket includes MD updates recorded in the in-memory MD log for the new MD page;
   performing said allocating the first physical storage for the new MD page, wherein the first physical storage is associated with the new MD page;
   generating a new LI for the new MD page; and
   updating the first entry, which denotes the mapping between the first ALI and a corresponding LI, to map the first ALI to the new LI thereby indicating that the first physical storage for the new MD page is allocated.

4. The computer-implemented method of claim 3, wherein said generating the first ALI representing the new MD page that is unallocated and is a child of the first MD page is performed by a first of a plurality of nodes in a data storage system, and wherein the in-memory MD log is local to the first node and used only by the first node.

5. The computer-implemented method of claim 4, wherein said generating the first ALI includes determining a current value for the first ALI.

6. The computer-implemented method of claim 5, wherein said determining the current value for the first ALI further comprises:
determining a plurality of values for a plurality of fields of the current value of the first ALI, wherein a first of the plurality of fields includes a first of the plurality of values indicating that the current value denotes an ALI associated with an unallocated MD page that is not mapped to physical storage.

7. The computer-implemented method of claim 6, wherein a second of the plurality of fields includes a second of the plurality of values indicating a bit value of an identifier of the in-memory MD log of the first node.

8. The computer-implemented method of claim 7, wherein a third of the plurality of fields includes a third of the plurality of values indicating that the first ALI is generated by the first node.

9. The computer-implemented method of claim 8, wherein a fourth of the plurality of fields includes a fourth of the plurality of values that is a sequence number generated by the first node from a sequence of monotonically increasing numbers.

10. The computer-implemented method of claim 9, wherein the first node includes a pair of in-memory MD logs comprising the in-memory MD log and a second in-memory MD log, wherein the first node records MD updates in one of the pair of in-memory MD logs currently designated as an active MD log, wherein MD updates are not recorded in a second of the pair of in-memory MD logs currently designated as an inactive MD log, wherein the in-memory MD log is designated as the active MD log when performing said MD split operation, wherein the second in-memory MD log is designated as the inactive log when performing said MD split operation.

11. The computer-implemented method of claim 10, wherein prior to said destaging, performing second processing comprising:
designating the in-memory MD log as the inactive MD log so that entries of the in-memory MD log can be destaged in said destaging; and
designating the second in-memory MD log as the active MD log where subsequent MD updates are recorded in the second in-memory MD log while the second in-memory MD log is designated as the active MD log.

12. The computer-implemented method of claim 11, wherein the pair of in-memory MD logs continually alternate designations as the active MD log and the inactive MD login, and wherein the sequence on the first node is reset to zero each time there is a switch in designation of the active MD log and the inactive MD log between the pair of in-memory MD logs.

13. The computer-implemented method of claim 12, wherein a fourth of the plurality of fields includes a fifth of the plurality of values that is a random number generated by the first node.

14. The computer-implemented method of claim 1, further comprising:
issuing, by the first node, a request for a first chunk of physical storage for a plurality of MD pages; and
locally allocating, by the first node, the first physical storage from the first chunk.

15. The computer-implemented method of claim 1, wherein the new MD page is used exclusively in connection with mapping logical addresses to physical storage locations for a first snapshot of a first logical device, wherein the first MD page is used in connection with mapping logical addresses to physical addresses for the first logical device, and wherein the new MD page is a child of the first MD page in the MD structure.

16. The computer-implemented method of claim 15, wherein prior to performing said MD split operation, the first MD page is shared for use in connection with mapping logical address to physical storage locations for the first snapshot and the first logical device.

17. A system comprising:
one or more processors; and
one or more memories comprising code stored thereon that, when executed, performs a method of comprising:
receiving a metadata (MD) structure including a plurality of MD pages; and
performing a MD split operation with respect to a first of the plurality of MD pages, wherein said performing the MD split operation with respect to the first MD page includes:
generating a first ALI (abstract logical index) representing a new MD page that is unallocated and is a child of the first MD page; and
storing a first entry in a first bucket of an in-memory MD log for the first ALI, wherein the first entry denotes a mapping between the first ALI and a corresponding LI (logical index), wherein the first entry indicates that the corresponding LI associated with the first ALI is invalid since the first ALI represents a new MD page which is unallocated and not associated with physical storage; and
destaging the in-memory MD log, wherein said destaging includes:
allocating first physical storage for the new MD page.

18. A non-transitory computer readable medium comprising code stored thereon that, when executed, performs a method comprising:
receiving a metadata (MD) structure including a plurality of MD pages; and
performing a MD split operation with respect to a first of the plurality of MD pages, wherein said performing the MD split operation with respect to the first MD page includes:
generating a first ALI (abstract logical index) representing a new MD page that is unallocated and is a child of the first MD page; and
storing a first entry in a first bucket of an in-memory MD log for the first ALI, wherein the first entry denotes a mapping between the first ALI and a corresponding LI (logical index), wherein the first entry indicates that the corresponding LI associated with the first ALI is invalid since the first ALI represents a new MD page which is unallocated and not associated with physical storage; and
destaging the in-memory MD log, wherein said destaging includes:
allocating first physical storage for the new MD page.

* * * * *